United States Patent
Phuyal et al.

(10) Patent No.: US 11,678,234 B2
(45) Date of Patent: Jun. 13, 2023

(54) TECHNIQUES FOR TRANSMITTING ON PRE-ALLOCATED RESOURCES IN WIRELESS COMMUNICATIONS

(71) Applicant: QUALCOMM Incorporated, San Diego, CA (US)

(72) Inventors: Umesh Phuyal, San Diego, CA (US); Alberto Rico Alvarino, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 16/784,201

(22) Filed: Feb. 6, 2020

(65) Prior Publication Data

US 2020/0260345 A1    Aug. 13, 2020

Related U.S. Application Data

(60) Provisional application No. 62/803,372, filed on Feb. 8, 2019.

(51) Int. Cl.
*H04W 36/00* (2009.01)
*H04W 72/04* (2023.01)

(52) U.S. Cl.
CPC ... *H04W 36/0072* (2013.01); *H04W 36/0079* (2018.08); *H04W 72/04* (2013.01)

(58) Field of Classification Search
CPC ..... H04W 36/08; H04W 36/14; H04W 84/12; H04W 36/0055; H04W 36/0022; H04W 36/0072; H04W 36/0079; H04W 72/04; H04W 72/21; H04W 72/0446

See application file for complete search history.

(56) References Cited

U.S. PATENT DOCUMENTS

| | | | | |
|---|---|---|---|---|
| 2001/0034239 | A1* | 10/2001 | Yamato | G08G 1/096716 455/524 |
| 2005/0272481 | A1* | 12/2005 | Kim | H04L 61/5053 455/574 |
| 2011/0211447 | A1* | 9/2011 | Wang | H04W 72/23 370/329 |
| 2013/0223391 | A1* | 8/2013 | Koo | H04W 72/1215 370/329 |
| 2014/0086112 | A1* | 3/2014 | Stern-Berkowitz | H04L 1/1854 370/280 |
| 2016/0219484 | A1* | 7/2016 | Bontu | H04W 36/24 |
| 2018/0049073 | A1* | 2/2018 | Dinan | H04W 72/569 |
| 2018/0199376 | A1 | 7/2018 | Kim et al. | |
| 2018/0279186 | A1* | 9/2018 | Park | H04W 36/30 |
| 2019/0053120 | A1* | 2/2019 | Park | H04W 36/305 |

(Continued)

FOREIGN PATENT DOCUMENTS

WO    2019160342 A1    8/2019

OTHER PUBLICATIONS

3GPP TSG-RAN2 Meeting #105 R2-1900781 Athens, Greece, Feb. 25,-Mar. 1, 2019 (Year: 2019).*

(Continued)

*Primary Examiner* — Atique Ahmed
(74) *Attorney, Agent, or Firm* — Arent Fox, LLP

(57) ABSTRACT

Aspects described herein relate to determining how to use pre-allocated uplink resources indicated as part of a handover procedure.

32 Claims, 11 Drawing Sheets

(56) References Cited

U.S. PATENT DOCUMENTS

2019/0297537 A1\* 9/2019 Tsai .................. H04W 72/23
2019/0297549 A1\* 9/2019 Suzuki ................ H04W 56/00

OTHER PUBLICATIONS

Qualcomm Incorporated: "Correction to Handling of Preallocated UL Grants during RACH-less HO", 3GPP TSG-RAN2 Meeting #105, R2-1900781, Athens, Greece, Feb. 25-Mar. 1, 2019, 7 pages.
ZTE Corporation: "Email Discussion Report on Open Issues of Mobility Enhancement", R2-168942, 3GPP TSG-RAN2 Meeting #96, Reno, Nevada, USA, Nov. 14-18, 2016, 13 pages.
"3rd Generation Partnership Project, Technical Specification Group Radio Access Network, Evolved Universal Terrestrial Radio Access (E-UTRA) and Evolved Universal Terrestrial Radio Access Network (E-UTRAN),Overall description, Stage 2 (Release 15)", 3GPP Draft 36300-F40, 3rd Generation Partnership Project (3GPP), Mobile Competence Centre, 650, Route Des Lucioles, F-06921 Sophia-Antipolis Cedex, France, Jan. 15, 2019 (Jan. 15, 2019), XP051686899, Retrieved from the Internet: URL: http://www.3gpp.org/ftp/3guInternal/3GPP%Fultimate.
"3rd Generation Partnership Project, Technical Specification Group Radio Access Network, Evolved Universal Terrestrial Radio Access (E-UTRA), Radio Resource Control (RRC), Protocol specification (Release 15)", 3GPP Draft, 36331-F40, 3rd Generation Partnership Project (3GPP), Mobile Competence Centre, 650, Route Des Lucioles, F-06921 Sophia-Antipolis Cedex, France Jan. 18, 2019 (Jan. 18, 2019), XP051601395, Retrieved from the Internet: URL:http://www.3gpp.org/ftp/tsg%5Fran/WG2%5FRL2/Specifications/201812%5Ffinal%5Fspecs%5Fafter%5FRAN%.
ERICSSON: "Release of UL grant at RACH-less procedures", 3GPP Draft, 3GPP TSG-RAN WG2 #97, R2-1701552 Release of UL Grant at RACH-Less Procedures, vol. RAN WG2, No. Athens, Greece, Feb. 13, 2017-Feb. 17, 2017, Feb. 12, 2017 (Feb. 12, 2017), XP051212173, 16 Pages, Retrieved from the Internet: URL:http://www.3gpp.org/ftp/Meetings_3GPP SYNC/RAN2/Docs/ [retrieved on Feb. 12, 2017], sections 1,2, p. 1-4. 4.
International Search Report and Written Opinion—PCT/US2020/017266—ISA/EPO—dated Apr. 30, 2020.

\* cited by examiner

US 11,678,234 B2

TECHNIQUES FOR TRANSMITTING ON PRE-ALLOCATED RESOURCES IN WIRELESS COMMUNICATIONS

CLAIM OF PRIORITY UNDER 35 U.S.C. § 119

The present Application for Patent claims priority to Provisional Application No. 62/803,372, entitled "TECHNIQUES FOR TRANSMITTING ON PRE-ALLOCATED RESOURCES IN WIRELESS COMMUNICATIONS" filed Feb. 8, 2019, which is assigned to the assignee hereof and hereby expressly incorporated by reference herein for all purposes.

BACKGROUND

Aspects of the present disclosure relate generally to wireless communication systems, and more particularly, to resources that can be pre-allocated during handover procedures.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, pre-allocated uplink grants can be enabled as part of handover to allow user equipment (UEs) to perform the handover from one base station to another without requiring a random access procedure to request an uplink grant. Information regarding the pre-allocated resources may be included in a handover command from one of the base stations, and a UE can then begin transmitting over the pre-allocated resources, including a message to confirm handover, a buffer status report, and/or uplink data. When the UE receives a corresponding contention resolution message from the target base station, the handover is considered completed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication by a user equipment (UE) is provided. The method includes receiving an indication of uplink resources pre-allocated at a target base station as part of a handover procedure from a serving base station to the target base station, determining a first time instance of the uplink resources based on the indication, transmitting a first uplink transmission in the first time instance of the uplink resources, determining one or more subsequent time instances of the uplink resources based on the indication and as occurring before the handover procedure is completed or occurring before it has been determined that the handover procedure has failed, and based on said determining of the one or more subsequent time instances of the uplink resources, performing one of refraining from transmitting in the one or more subsequent time instances of the uplink resources, or transmitting a retransmission of the first uplink transmission in the one or more subsequent time instances of the uplink resources.

In another example, an apparatus for wireless communication is provided that includes a transceiver, a memory configured to store instructions related to transmitting over uplink resources, and one or more processors communicatively coupled with the transceiver and the memory. The one or more processors are configured to receive an indication of uplink resources pre-allocated at a target base station as part of a handover procedure from a serving base station to the target base station, transmit, over the uplink resources in a first time instance of the uplink resources determined based on the indication, a first uplink transmission, determine a first time instance of the uplink resources based on the indication, transmit a first uplink transmission in the first time instance of the uplink resources, determine one or more subsequent time instances of the uplink resources based on the indication and as occurring before the handover procedure is completed or occurring before it has been determined that the handover procedure has failed, and based on the determination of the one or more subsequent time instances of the uplink resources, the one or more processors being further configured to perform one of refrain from transmitting in the one or more subsequent time instances of the uplink resources, or transmit a retransmission of the first uplink transmission in the one or more subsequent time instances of the uplink resources.

In another example, an apparatus for wireless communication is provided that includes means for receiving an indication of uplink resources pre-allocated at a target base station as part of a handover procedure from a serving base station to the target base station, means for transmitting, over the uplink resources in a first time instance of the uplink resources determined based on the indication, a first uplink transmission, means for determining a first time instance of the uplink resources based on the indication, means for transmitting a first uplink transmission in the first time instance of the uplink resources, means for determining one or more subsequent time instances of the uplink resources based on the indication and as occurring before the handover procedure is completed or occurring before it has been determined that the handover procedure has failed, and based on the determination of the one or more subsequent time instances of the uplink resources, at least one of means for refraining from transmitting in the one or more subsequent time instances of the uplink resources or means for transmitting a retransmission of the first uplink transmission in the one or more subsequent time instances of the uplink resources.

In another example, a computer-readable medium, including code executable by one or more processors for wireless communications is provided. The code includes code for receiving an indication of uplink resources pre-allocated at a target base station as part of a handover procedure from a serving base station to the target base station, transmitting, over the uplink resources in a first time instance of the uplink resources determined based on the indication, a first uplink transmission, code for determining a first time instance of the uplink resources based on the indication, code for transmitting a first uplink transmission in the first time instance of the uplink resources, code for determining one or more subsequent time instances of the uplink resources based on the indication and as occurring before the handover procedure is completed or occurring before it has been determined that the handover procedure has failed, and based on the determination of the one or more subsequent time instances of the uplink resources, at least one of code for refraining, based on the determination, from transmitting in the one or more subsequent time instances of the uplink resources or code for transmitting a retransmission of the first uplink transmission in the one or more subsequent time instances of the uplink resources.

In another example, a method for wireless communications is provided. The method includes receiving, by a user equipment, an indication of uplink resources pre-allocated at a target base station as part of a handover procedure from a serving base station to the target base station, transmitting, by the user equipment over the uplink resources in a first time instance determined based on the indication, a first uplink transmission comprising at least one of a message to confirm the handover procedure, a buffer status report, or uplink data, and transmitting, by the user equipment over a second uplink resource, determined based on the indication and as occurring before the handover procedure is completed or before it has been determined that the handover procedure has failed, a retransmission of the first uplink transmission, wherein the second uplink resource is adjacent in time to the first time instance based on the indication.

In another example, a method for wireless communications is provided. The method includes receiving, by a user equipment, an indication of uplink resources pre-allocated at a target base station as part of a handover procedure from a serving base station to the target base station, transmitting, by the user equipment over the uplink resources in a first time instance determined based on the indication, a first uplink transmission comprising at least one of a message to confirm the handover procedure, a buffer status report, or uplink data, transmitting, by the user equipment over a second uplink resource, determined based on the indication and occurring before the handover is completed or determined as failed, a first uplink data transmission, wherein the second uplink resource is adjacent in time to the first time instance based on the indication, and refraining, by the user equipment, from transmitting a subsequent uplink data transmission in a third uplink resource, determined based on the indication and as occurring before the handover procedure is completed or before it has been determined that the handover procedure has failed, based at least in part on at least one of receiving an acknowledgement for the first uplink transmission or determining that no uplink data is available to transmit.

In another example, a method for wireless communications is provided. The method includes transmitting, for a target base station to a user equipment, an indication of uplink resources pre-allocated at the target base station as part of a handover procedure from a serving base station to the target base station, receiving, from the user equipment over the uplink resources in a first time instance and based on the indication, a first uplink transmission comprising at least one of a message to confirm the handover procedure, a buffer status report, or uplink data, transmitting, in response to the first uplink transmission, an acknowledgement that the first uplink transmission is successfully received, and releasing, by the target base station and based on transmitting the acknowledgement, the uplink resources indicated as pre-allocated in one or more subsequent time instances based on a periodicity configured in the indication of uplink resources.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
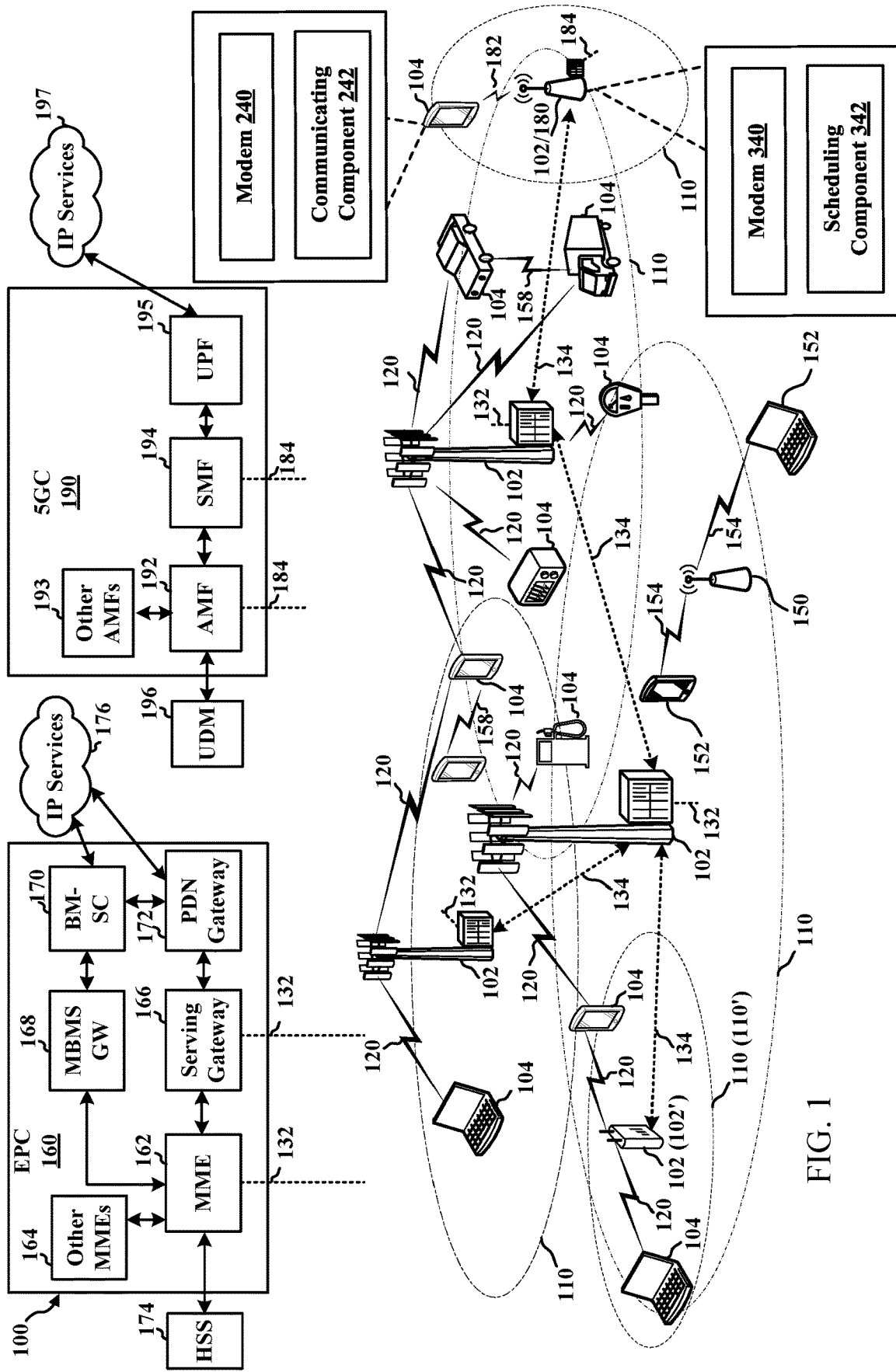
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to using pre-allocated resources determined as part of a handover procedure for transmitting or refraining from transmitting certain messages. For example, after the initial transmission, additional pre-allocated resources that occur before handover is considered completed (or failed) are defined and are conventionally used by a user equipment (UE) to transmit something, be it actual uplink data or padded bits. This, however, may not always be desirable and may consume unnecessary resources.

For example, in long term evolution (LTE) (e.g., LTE Release 14 (Rel-14)) "pre-allocated uplink (UL) grant" is defined to enable UEs to perform "random access channel (RACH)-less" handover, which allows reduced delay during handover by not requiring the UE to perform a RACH procedure as part of the handover. In this example, the network (which can include one or more of a base station, radio network controller (RNC) or other gateway, one or more core network nodes described herein, etc.) can "pre-allocate" UL grants in a target base station, and can include an indication and/or other information related to the pre-allocated UL grants in the handover command for the UE. For example, the information can include a periodicity (e.g., in number of subframes) of the pre-allocated UL grants, a starting subframe of a first pre-allocated UL grant, an indication of the grant of resources (e.g., in frequency), etc. In this regard, the UE can access the target cell quickly using the pre-allocated UL grant to send data to the target cell, instead of requiring performing of a legacy Random Access procedure. For example, in handover (HO) with legacy random access (RA), the UE otherwise sends a preamble, gets a random access response (RAR), and uses the grant in the RAR to send a radio resource control (RRC) Connection Reconfiguration Complete message to the (target) cell.

According to current third generation partnership project (3GPP) specifications, where pre-allocated UL grants are enabled, depending on the size of a pre-allocated UL grant, UE may send buffer status report (BSR) and/or UL data along with RRC Connection Reconfiguration Complete message to the target cell on the pre-allocated UL grant, without necessarily performing the Random Access Procedure. 3GPP technical specification (TS) 36.300 states that "when the RACH-less HO is configured, after the UE has received uplink grant, the UE sends the RRCConnectionReconfigurationComplete message (C-RNTI) to confirm the handover, along with an uplink Buffer Status Report, and/or UL data, whenever possible, to the target eNB. The target eNB verifies the C-RNTI sent in the RRCConnectionReconfigurationComplete message. The target eNB can now begin sending data to the UE. The handover procedure is completed for the UE when the UE receives the UE contention resolution identity MAC control element from the target eNB." In addition, 3GPP TS 36.331 states "if MAC indicates the successful reception of a PDCCH transmission addressed to C-RNTI and if rach-Skip is configured: stop timer T304; release rach-Skip." T304 can correspond to a timer that the UE can initialize based on performing handover, after expiration of which the handover can be considered failed. Specifically, in LTE, the pre-allocated UL grant can have possible periodicities of 2, 5, or 10 subframes, as specified in the indication described above.

In addition, in LTE, pre-allocated grants are no longer valid after HO has been indicated to be successful or HO failure is detected. When pre-allocated UL grants are enabled, during the period after the UE has transmitted the RRC Connection Reconfiguration Complete, and before one of the time when HO completion is indicated by the eNB (e.g. contention resolution is received from eNB or T304 stopped) or the time HO failure is confirmed by T304 expiry, conventionally, behavior is not defined with respect to whether UE may assume it has valid pre-allocated UL grants. When periodicity of pre-allocated UL grants is small, there may be more pre-allocated UL grants that are not known to be valid after this point. If UL skipping is configured, according to current LTE specification (3GPP TS 36.321), UE shall attempt to transmit UL data whenever there is UL data (i.e. UL buffer is not empty). When UL skipping is not configured, according to current LTE specification, UE shall transmit padding even if there is no UL data. This, however, may not be an intelligent or efficient usage of the pre-allocated UL grants.

Described herein are various examples for using these pre-allocated UL grants for transmitting certain messages or refraining from transmitting any messages or padding, etc. In the various examples described herein, the UE can use a first pre-allocated UL grant (which may be the first configured pre-allocated UL grant or a subsequent UL grant) to send an initial uplink transmission including at least one of a message to confirm the handover, a BSR, and/or uplink data. In one example, the UE can then skip or ignore (e.g., refrain from transmitting on) the rest of the resources corresponding to the pre-allocated UL grant. In addition, in one example, the UE can, however, use subsequent resources corresponding to the pre-allocated UL grant for retransmitting the initial uplink transmission, regardless of whether the UE has additional UL data to transmit.

In another example, after the initial UL transmission, the UE can retransmit the initial uplink transmission in subsequent opportunities defined by resources corresponding to the pre-allocated UL grants. In this example, the retransmissions can use the same redundancy version (RV) as the initial uplink transmission to allow the base station (e.g., eNB, gNB, etc.) to combine the transmissions. In this example, the UE can stop the retransmissions based on receiving an acknowledgement feedback from the base station. In another example, the UE can stop the retransmissions based on detecting that a maximum allowable number of retransmissions has been achieved. In this example, the maximum allowable number of retransmissions may be fixed in the standard (e.g., and instructions for determining the number can be stored in a memory of the UE) or configured by the network. In yet another example, after the initial UL transmission, the UE can transmit uplink data in subsequent opportunities defined by resources corresponding to the pre-allocated UL grants. The UE can stop transmitting the uplink data based on receiving an acknowledgement feedback from the base station for the initial uplink transmission. In addition, the UE can stop transmitting the uplink data where there is no more data to transmit (e.g., instead of transmitting padded bits in the opportunities). In any case, once a handover completion or failure is determined, the UE can also stop using resources of the pre-allocated UL grant in this instance.

The described features will be presented in more detail below with reference to FIGS. 1-11.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining how to use resources of a pre-allocated grant (also referred to herein as "pre-allocated resources" or "pre-allocated UL resources" or "pre-allocated UL grant") during handover. In addition, some nodes may have a modem 340 and scheduling component 342 for scheduling or otherwise enabling usage of pre-allocated uplink resources during handover, as described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1/M2) UEs, NB-IoT (also referred to as CAT NB1/NB2) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 can schedule pre-allocated uplink resources to a UE 104 as part of handing over the UE 104 from a serving base station to a target base station. The pre-allocated uplink resources can be used in certain periods of time, which can be indicated in a configuration of the pre-allocated uplink resources. Communicating component 242 can receive the indication of the pre-allocated uplink resources and can determine how to use the pre-allocated uplink resources during handover. For example, communicating component 242 can determine to transmit at least a first uplink transmission over the pre-allocated uplink resources, where the first uplink transmission can include at least one of a message to confirm the handover, a buffer status report of the UE 104, and/or uplink data. In one example, the remaining pre-allocated uplink resources can be skipped or left blank (e.g., the UE 104 can refrain from transmitting over the remaining pre-allocated uplink resources). Additionally or alternatively, for example, the UE can include, in one or more of the remaining pre-allocated uplink resources, retransmissions of the first uplink transmission where determined to be retransmitted based on feedback or otherwise. In other examples, the UE 104 can include transmission of additional uplink data over the remaining pre-allocated uplink resources that may cease when acknowledgement feedback is received for the first uplink transmission, etc., as described above and further herein.

Turning now to FIGS. 2-11, aspects are depicted with reference to one or more components and one or more methods that may perform the actions or operations described herein, where aspects in dashed line may be optional. Although the operations described below in FIGS. 4-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
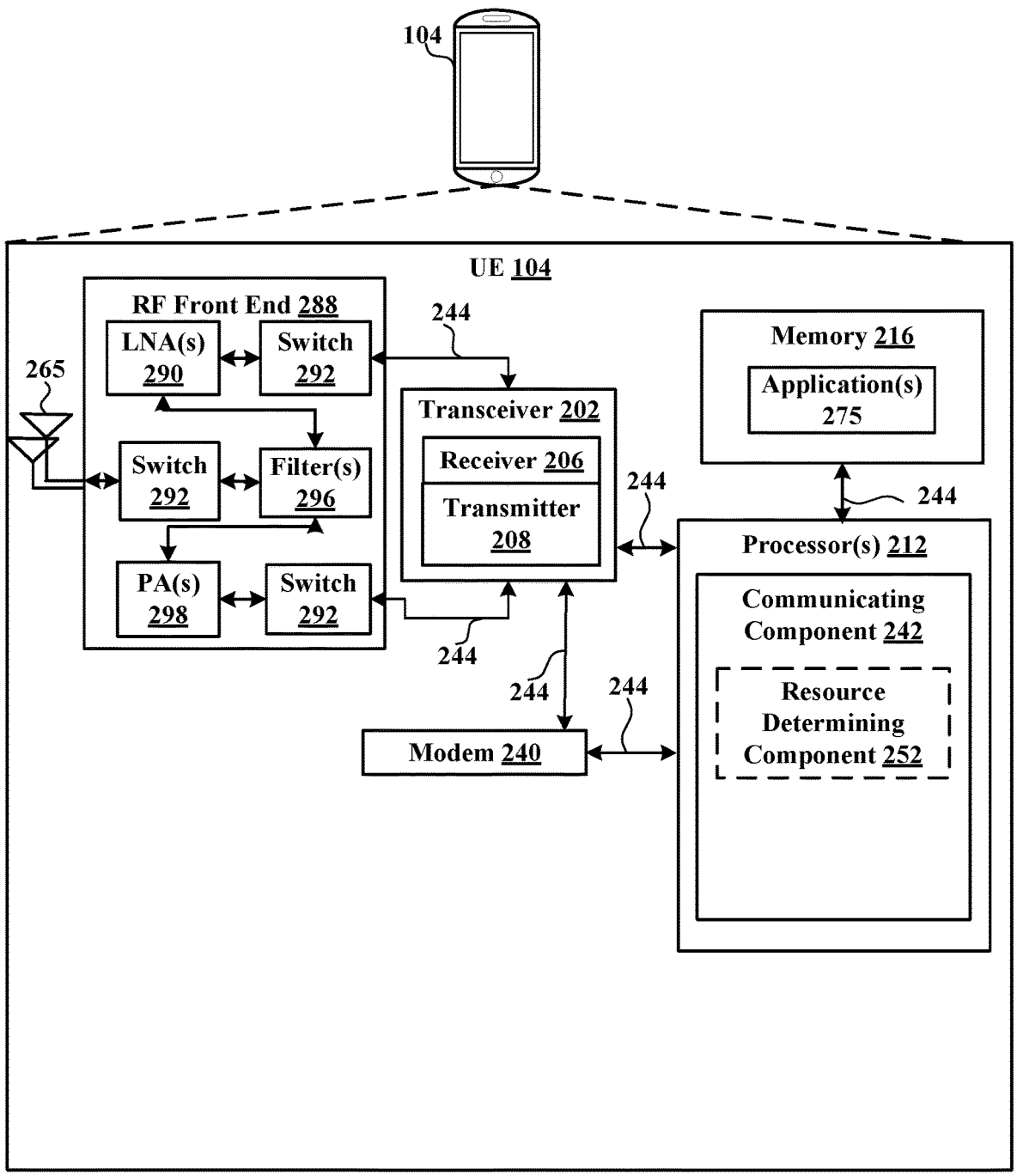
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 to determine how to use pre-allocated uplink resources that are indicated as part of a handover procedure.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a resource determining component 252 for determining the pre-allocated uplink resources indicated as part of a handover procedure.

In an aspect, the processor(s) 212 may correspond to one or more of the processors described in connection with the UE in FIG. 11. Similarly, the memory 216 may correspond to the memory described in connection with the UE in FIG. 11.

Figure 3:
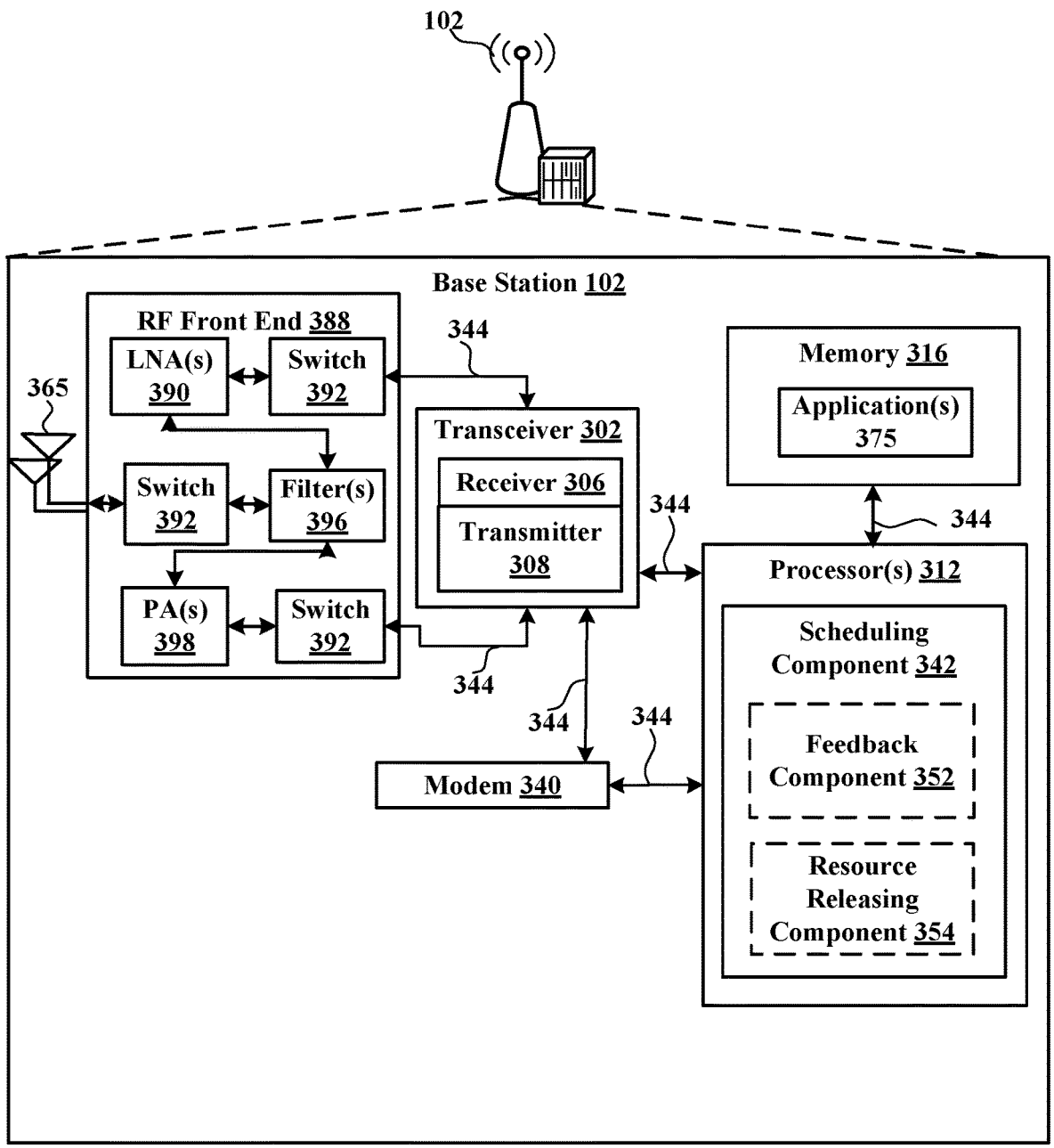
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling or otherwise enabling usage of pre-allocated uplink resources as part of a handover procedure.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a feedback component 352 for indicating feedback for one or more uplink transmissions received over pre-allocated uplink resources and/or a resource releasing component 354 for releasing one or more pre-allocated uplink resources, e.g., based on acknowledging receipt of a first uplink transmission.

In an aspect, the processor(s) 312 may correspond to one or more of the processors described in connection with the base station in FIG. 11. Similarly, the memory 316 may correspond to the memory described in connection with the base station in FIG. 11.

Figure 4:
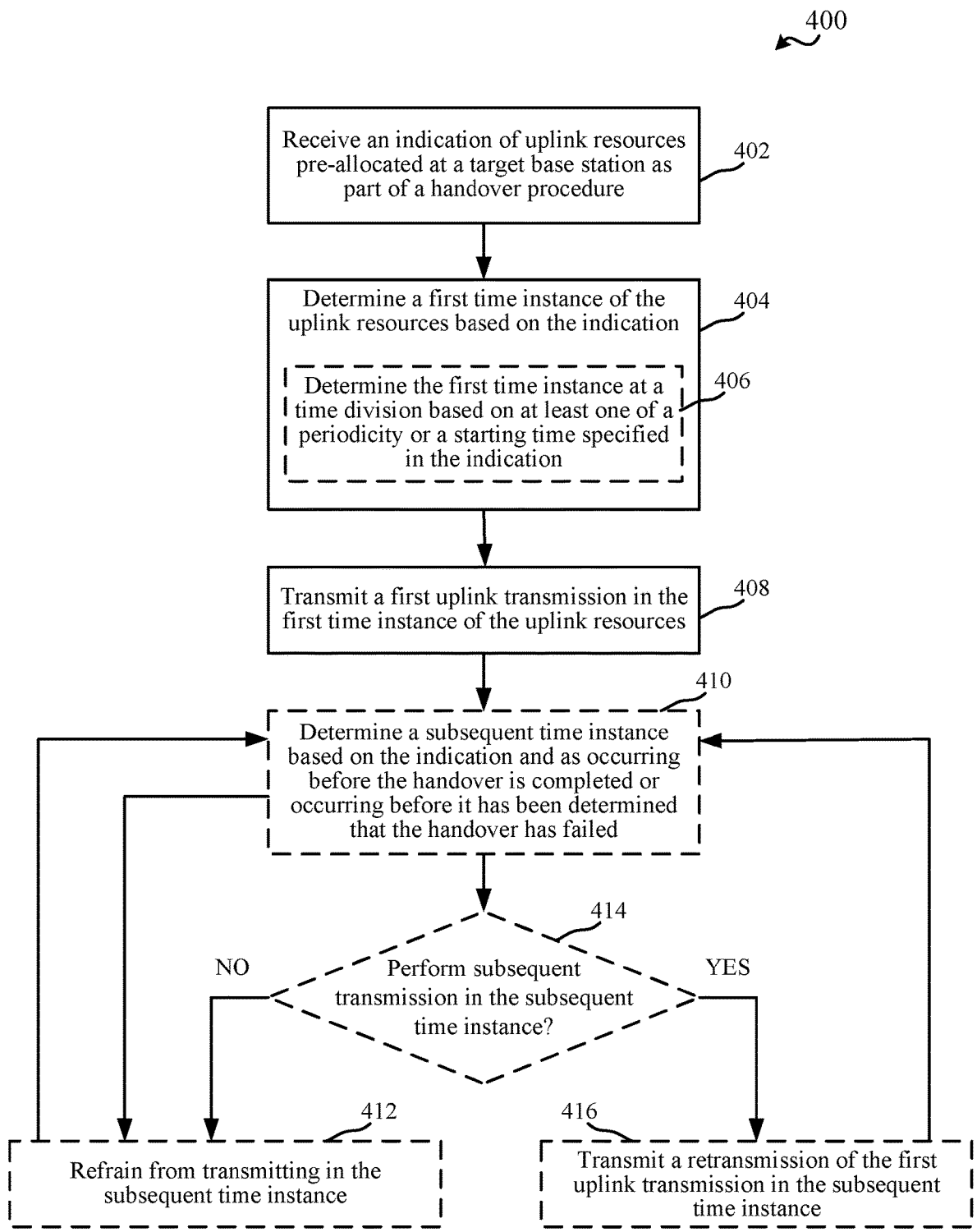
FIG. 4 is a flow chart illustrating an example of a method for refraining from transmitting data over pre-allocated uplink resources, in accordance with various aspects of the present disclosure.

FIG. 4 illustrates a flow chart of an example of a method 400 for determining how to use pre-allocated uplink resources in a handover procedure. In an example, a UE 104 can perform the functions described in method 400 using one or more of the components described in FIGS. 1 and 2.

In method 400, at Block 402, an indication of uplink resources pre-allocated at a target base station can be received as part of a handover procedure. In an aspect, resource determining component 252, e.g., in conjunction with processor(s) 212, memory 216, transceiver 202, communicating component 242, etc., can receive the indication of the uplink resources pre-allocated at the target base station as part of the handover procedure. In an example, a handover procedure can be initiated for the UE 104 to handover communications from a serving base station to a target base station. In an example, the serving base station can initiate the handover procedure based on measurement reports received from the UE 104 and/or based on detecting one or more events, which may be based on signal power/quality of the target base station as indicated by the measurement reports. In an example, the handover procedure can relate to handover of all communications from the serving base station to the target base station, handover of some communications (e.g., one or more component carriers, associated radio or data bearers, etc.) to the target base station, and/or the like. As part of the handover, as described, uplink resources may be pre-allocated at the target base station to allow the UE 104 to transmit uplink communications over the pre-allocated resources without requiring a random access, or RACH, procedure to receive an uplink resource grant.

In an example, an indication related to the pre-allocated uplink resources can be transmitted during the handover procedure (e.g., by the serving base station or the target base station to the UE 104). For example, the indication may be transmitted in a handover command received from the serving base station, where the handover command indicates to handover to the target base station. In addition, for example, the indication may include one or more parameters from which the pre-allocated uplink resources can be determined. In a specific example, the parameters in the indication may include a periodicity at which the pre-allocated resources are granted (e.g., expressed as a number of subframes, slots, symbols, etc. between the pre-allocated resources), a starting time at which the pre-allocated resources begin and are pre-allocated based on the periodicity from the starting time (e.g., expressed as a starting subframe, slot, symbol, etc., or an offset of a starting subframe, slot, symbol, etc. from a current subframe, slot, symbol, etc.), the resource grant for the pre-allocated resources in the frequency space (e.g., a number of resource blocks (RBs), an indication of a starting RB, etc.), and/or the like, as described herein. In one example, communications between the UE 104 and base station 102 can be configured to occur in time divisions, such as orthogonal frequency division multiplexing (OFDM) or single-carrier frequency division multiplexing (SC-FDM) symbols, a slot that includes one or more symbols, a subframe that includes one or more slots, etc.; thus, the periodicity and/or starting time may be specified in terms of a number of subframes, slots, or symbols, as described. In any case, for example, resource determining component 252 can determine, based on the indication, the pre-allocated resources at the indicated frequency, starting at the starting time instance, and occurring at each subsequent time instances as indicated by the periodicity. Given the pre-allocated resources, the UE 104 can determine how to use the resources until the handover procedure is considered completed or otherwise fails.

In method 400, at Block 404, a first time instance of the uplink resources can be determined based on the indication. In an aspect, resource determining component 252, e.g., in conjunction with processor(s) 212, memory 216, transceiver 202, communicating component 242, etc., can determine the first time instance of the uplink resources based on the indication. For example, the indication may include an indication of one or more parameters for determining the pre-allocated uplink resources (e.g., for determining at least time divisions of the pre-allocated uplink resources. Resource determining component 252 can accordingly determine the first time instance based on the indication, which may be a first indicated time instance, a first time instance following determination of the time instance, etc.

In determining the first time instance at Block 400, optionally at Block 406, the first time instance can be determined at a time division based on at least one of a periodicity or a starting time specified in the indication. In an aspect, resource determining component 252, e.g., in conjunction with processor(s) 212, memory 216, transceiver 202, communicating component 242, etc., can determine the first time instance at the time division based on at least one of the periodicity or the starting time specified in the indication. For example, the periodicity can be indicated as a number of time divisions (e.g., a number of subframes, slots, symbols, etc.) between resources (e.g., time instances) of the pre-allocated uplink grant. In another example, the starting time can be indicated as an index or offset (in terms of time division) of a time instance of a first resource of the pre-allocated uplink grant. In one example, given a radio frame of 10 subframes, the starting time can be indicated as an index of a subframe within the radio frame that includes the first resource of the pre-allocated uplink grant.

In a specific example, resource determining component 252 can receive the indication (e.g., at Block 402) in a RRC configuration from the base station 102. For example, resource determining component 252 can receive an information element (IE) in RRC signaling from the base station 102 that may have a format similar to the following:

```
ul-ConfigInfo-r14                    SEQUENCE {
    numberOfConfUL-Processes-r14    INTEGER (1..8),
    ul-SchedInterval-r14            ENUMERATED {sf2, sf5, sf10},
    ul-StartSubframe-r14            INTEGER (0..9),
    ul-Grant-r14                    BIT STRING (SIZE (16))
}
```

In this example, resource determining component 252 can determine the first time instance corresponding to the first occurrence of the pre-allocated UL grant based on the ul-StartSubframe-r14 (e.g., an index of the subframe within the current or next radio frame), and/or based on the ul-SchedInterval-r14, which can be an indication of the periodicity of the resources of the pre-allocated uplink grant (e.g., 2, 5, or 10 subframes). In one example, resource determining component 252 may determine the first occurrence of the pre-allocated UL grant not necessarily as the first configured time instance of the pre-allocated uplink grant, but possibly an occurrence of a subsequent time instance of the pre-allocated uplink grant (e.g., where the UE 104 is not prepared to transmit in the first time instance of the first configured resource or otherwise).

In method 400, at Block 408, a first uplink transmission can be transmitted over the uplink resources in a first time instance determined based on the indication. In an aspect, communicating component 242, e.g., in conjunction with processor(s) 212, memory 216, transceiver 202, etc., can transmit, over the uplink resources in the first time instance determined based on the indication, the first uplink transmission. For example, resource determining component 252 can determine the first time instance as a time instance for the pre-allocated resources specified by the indication received at Block 402 (e.g., as described with reference to determining the first time instance at Block 404 above or otherwise). For example, resource determining component 252 can determine the first time instance as the starting time (e.g., a starting subframe or slot) specified in the indication, or as a subsequent time related to the pre-allocated uplink grant. Communicating component 242 can accordingly transmit the first uplink transmission over the granted resources (e.g., as also specified in the indication) in the first time instance. In an example, the first uplink transmission may include a message to confirm the handover and/or confirm switching of radio resources at the UE 104 to accommodate the handover (e.g., a RRC Connection Reconfiguration Complete message). In addition, for example, the first uplink transmission may additionally or alternatively include a BSR for a buffer at the UE 104 (e.g., an indication of how much data is in the buffer, as compared to a buffer capacity or otherwise). In addition, for example, the first uplink transmission may additionally or alternatively include uplink data to be transmitted. In one example, the contents of the first uplink transmission may be based on a size of the uplink resources in the first time instance.

In method 400, optionally at Block 410, a subsequent time instance (e.g., another time instance corresponding to the pre-allocated UL resources at a subsequent time) can be determined based on the indication and as occurring before the handover is completed or occurring before it has been determined that the handover has failed. In an aspect, resource determining component 252, e.g., in conjunction with processor(s) 212, memory 216, transceiver 202, communicating component 242, etc., can determine the subsequent time instance based on the indication and as occurring before the handover is completed or occurring before it has been determined that the handover has failed. For example, resource determining component 252 can determine the subsequent time instance corresponding to the pre-allocated UL grant based on the indication as a time instance consistent with the periodicity from the starting time (e.g., starting time+(periodicity*N), where N can be an integer). In addition, resource determining component 252 can determine the subsequent time instance corresponding to the pre-allocated UL grant as occurring before handover is considered complete or before handover is determined as failed. In an example, handover can be considered complete when the UE 104 receives a UE contention resolution identity MAC control element from the target base station, and/or handover can be determined as failed if the T304 timer expires before the UE contention resolution identity MAC control element is received from the target base station.

In any case, in method 400, optionally at Block 412, transmitting can be refrained from in the subsequent time instance (e.g., corresponding to the pre-allocated UL grant). In an aspect, communicating component 242, e.g., in conjunction with processor(s) 212, memory 216, transceiver 202, etc., can refrain from transmitting, or otherwise can determine not to transmit, in the subsequent time instance. In an example, communicating component 242 can determine to refrain from transmitting in any of the pre-allocated uplink resources in subsequent time instances defined by the pre-allocated resources grant until the handover is considered complete or until the handover is determined as failed. In another example, communicating component 242 can determine to refrain from transmitting in any of the pre-allocated uplink resources in subsequent time instances defined by the pre-allocated resources grant except when the transmission pertains to the first uplink transmission or retransmissions thereof (e.g., as described with reference to Block 416 below). In an example, resource determining component 252 may or may not determine the resources of the subsequent time instances, and communicating component 242 can refrain from transmitting in resources of the pre-allocated UL grant in the subsequent time instance based on determining to refrain from transmitting over any subsequent time instances of the pre-allocated UL grants until it is time for retransmitting the first uplink transmission. Thus, for example, the UE 104 does not transmit anything (e.g., not even padded bits) in at least some of the time instances corresponding to the pre-allocated uplink resources and before the handover is considered complete or failed, as described herein.

In an example, refraining from transmitting in a time instance can be based on a determination of whether to transmit or not. For example, in method 400, optionally at Block 414, it can be determined whether to perform a subsequent transmission in the subsequent time instance (e.g., corresponding to the pre-allocated UL grant). In an aspect, communicating component 242, e.g., in conjunction with processor(s) 212, memory 216, transceiver 202, etc., can determine whether to perform the subsequent transmission in the subsequent time instance. As described, for example, communicating component 242 can determine to not perform subsequent transmission in any of the pre-allocated uplink resources in subsequent time instances defined by the pre-allocated resources grant (e.g., after transmitting the first uplink transmission) except when the transmission pertains to the first uplink transmission or retransmissions thereof. Thus, in one example, determining whether to perform subsequent transmission in the subsequent time instance can be based on determining whether NACK is received (or a period of time has elapsed without receiving feedback), based on determining that the resources of the subsequent time instance are indicated as resources for retransmission, etc. As described, where it is determined to not perform the subsequent transmission, communicating component 242 can refrain from transmitting, as described in reference to Block 412 above. In an example, the method 400 may proceed from Block 412 to Block 410 to determine and evaluate a next subsequent time instance (e.g., based on the periodicity and/or starting time specified in the indication), and so on (e.g., before handover is indicated as completed or failed).

Where it is determined to perform the subsequent transmission at Block 414 (e.g., based on receiving NACK, not receiving feedback within a period of time, etc.), in method 400, optionally at Block 416, a retransmission of the first uplink transmission can be transmitted in the subsequent time instance. In an aspect, communicating component 242, e.g., in conjunction with processor(s) 212, memory 216, transceiver 202, etc., can transmit, over the uplink resources in the subsequent time instance, a retransmission of the first uplink transmission. In an example, resource determining component 252 can determine the subsequent time instance for retransmitting the first uplink transmission based at least in part on determining that an acknowledgement is not received for the first uplink transmission, as described. For example, resource determining component 252 can determine that an acknowledgment is not received at least in part by at least one of determining that no feedback is received for the first uplink transmission or a retransmission thereof (e.g., within a threshold period of time defined or configured for receiving feedback) and/or determining that a negative acknowledgement is received for the first uplink transmission or retransmission thereof. In another example, resource determining component 252 can determine that the subsequent time instance is occurring before the handover is completed or occurring before handover is determined as failed (e.g., based on determining that handover has not completed or determining that handover has not failed by the time of the subsequent time instance). In any case, for example, resource determining component 252 can determine the uplink resources in the subsequent time instance of the pre-allocated uplink resources occurring after the determination that no feedback is received or that negative acknowledgement is received. An example is shown in FIG. 8.

Figure 8:
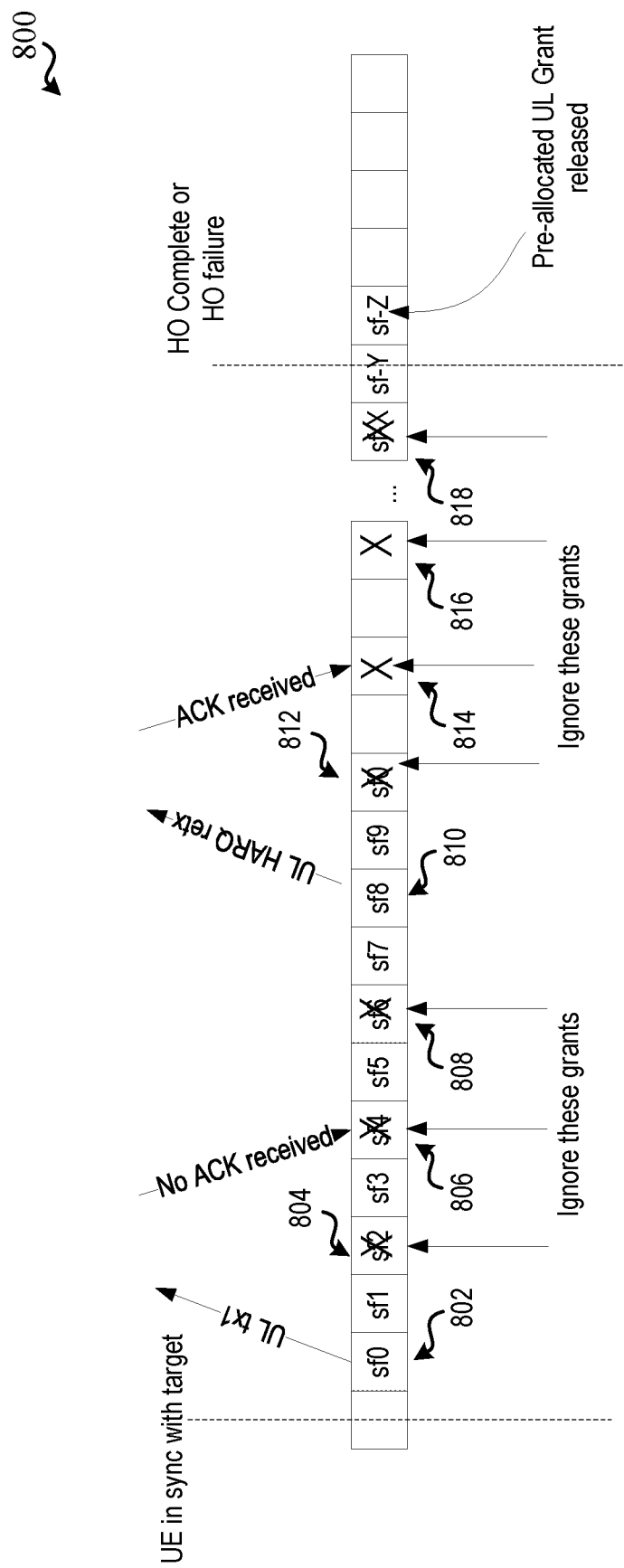
FIG. 8 illustrates an example of a resource allocation for refraining from transmitting data over pre-allocated uplink resources, in accordance with various aspects of the present disclosure.

FIG. 8 illustrates an example of a resource allocation 800 with subframes of pre-allocated uplink resources. In resource allocation 800, the UE can receive an indication of pre-allocated uplink resources with starting subframe 802 and with a periodicity of two subframes, such that pre-allocated uplink resources are in every other subframe, including subframes 804, 806, 808, 810, 812, 814, 816, 818, as shown. In this example, communicating component 242 can transmit the first uplink transmission in subframe 802 and can skip resources in one or more subsequent subframes, (e.g., in subframes 804, 806, 808 as shown). Communicating component 242 can also retransmit the first uplink transmission in subframe 810 based on detecting that no acknowledgement is received for the first uplink transmission transmitted at subframe 802 (or based on receiving a negative-acknowledgment for the first uplink transmission, as described above). In this example, the UE may skip/ignore rest of the pre-allocated grants (e.g., in subframes 812, 814, 816, 818) except for the ones used for HARQ retransmissions, as described. In an example, the UE can further refrain from transmitting in any of the remaining pre-allocated UL grant subframes once ACK is received (e.g., at subframe 814). In addition, for example, HARQ retransmissions may be adaptive or non-adaptive. Also, the UE may not be expected to use the pre-allocated grants for further UL data transmission. In an example, this can also result in the base station releasing the pre-allocated grants upon detecting first transmission from the UE, upon transmitting acknowledgement feedback for the first transmission, upon receiving an indicator that the UE received the acknowledgement feedback, and/or the like. In addition, for example, the base station can release the pre-allocated grant resources following handover complete or failure, as shown and further described herein.

Figure 5:
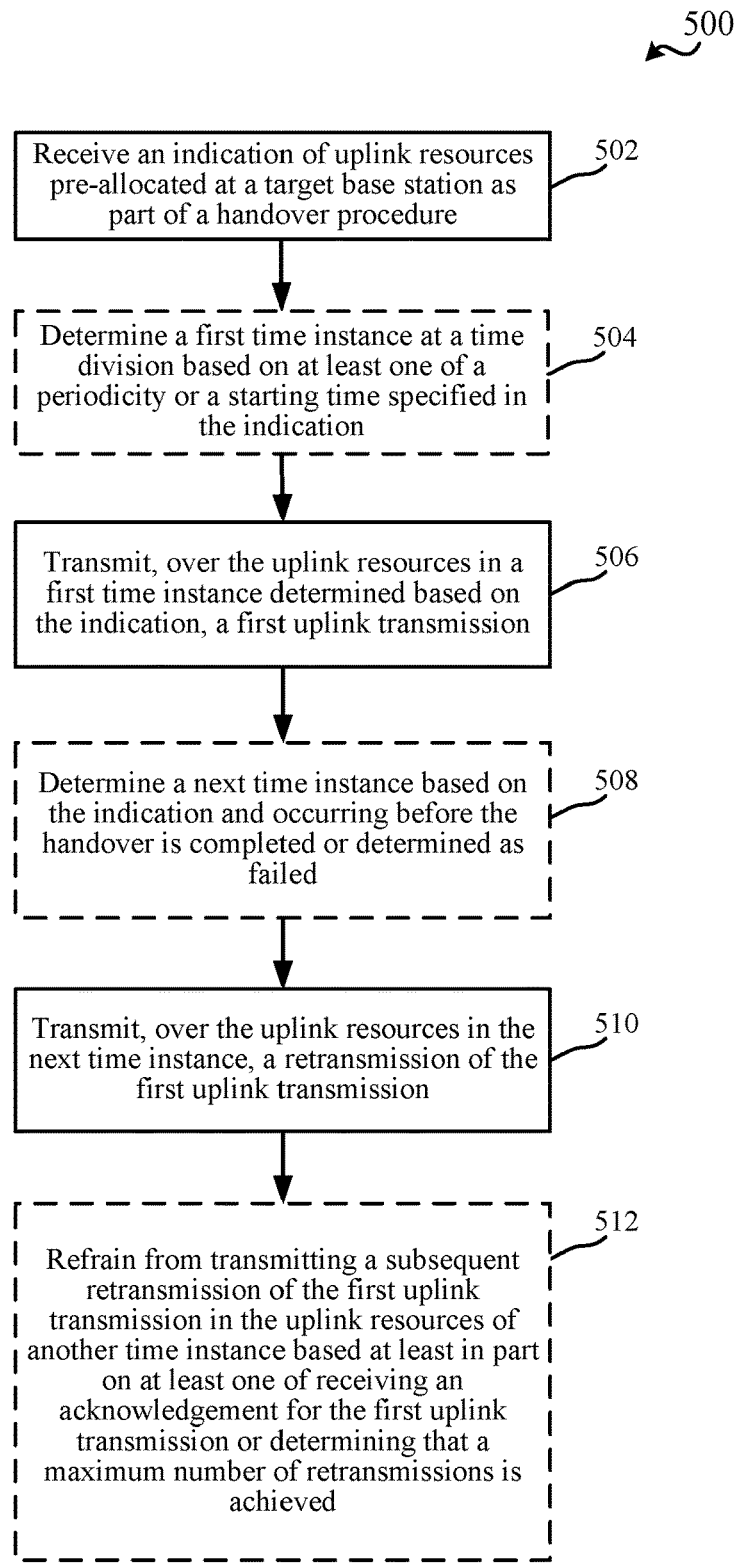
FIG. 5 is a flow chart illustrating an example of a method for retransmitting a first uplink transmission over pre-allocated uplink resources, in accordance with various aspects of the present disclosure.

FIG. 5 illustrates a flow chart of an example of a method 500 for determining how to use pre-allocated uplink resources in a handover procedure. In an example, a UE 104 can perform the functions described in method 500 using one or more of the components described in FIGS. 1 and 2.

In method 500, at Block 502, an indication of uplink resources pre-allocated at a target base station can be received as part of a handover procedure. In an aspect, resource determining component 252, e.g., in conjunction with processor(s) 212, memory 216, transceiver 202, communicating component 242, etc., can receive the indication of the uplink resources pre-allocated at the target base station as part of the handover procedure, as described with respect to Block 402 in method 400 of FIG. 4.

In method 500, optionally at Block 504, a first time instance can be determined at a time division based on at least one of a periodicity or a starting time specified in the indication. In an aspect, resource determining component 252, e.g., in conjunction with processor(s) 212, memory 216, transceiver 202, communicating component 242, etc., can determine the first time instance at the time division based on at least one of the periodicity or the starting time specified in the indication, as described with respect to Block 404 in method 400 of FIG. 4.

In method 500, at Block 506, a first uplink transmission can be transmitted over the uplink resources in a first time instance determined based on the indication. In an aspect, communicating component 242, e.g., in conjunction with processor(s) 212, memory 216, transceiver 202, etc., can transmit, over the uplink resources in the first time instance determined based on the indication, the first uplink transmission, as described with respect to Block 408 in method 400 of FIG. 4.

In method 500, optionally at Block 508, a next time instance can be determined based on the indication and occurring before the handover is completed or determined as failed. In an aspect, resource determining component 252, e.g., in conjunction with processor(s) 212, memory 216, transceiver 202, communicating component 242, etc., can determine the next time instance (e.g., a time instance of a next uplink resource within the pre-allocated UL grant) based on the indication and occurring before the handover is completed or determined as failed. For example, resource determining component 252 can determine the next time instance from the first time instance based on the indication as a time instance consistent with the periodicity from the starting time (e.g., starting time+periodicity). In addition, resource determining component 252 can determine the next time instance as occurring before handover is considered complete or determined as failed. In an example, handover can be considered complete when the UE 104 receives a UE contention resolution identity MAC control element from the target base station, and/or handover can be determined as failed if the T304 timer expires before the UE contention resolution identity MAC control element is received from the target base station, as described.

In any case, in method 500, at Block 510, a retransmission of the first uplink transmission can be transmitted over the uplink resources in the next time instance. In an aspect, communicating component 242, e.g., in conjunction with processor(s) 212, memory 216, transceiver 202, etc., can transmit, over the uplink resources in the next time instance (e.g., determined as described in reference to Block 508), the retransmission of the first uplink transmission. In an example, communicating component 242 can transmit the retransmission using a same RV as used to transmit the first uplink transmission to allow the base station receiving the first uplink transmission and retransmission (and/or additional retransmissions) to combine them to decode the message received. In addition, for example, communicating component 242 can continue to retransmit the first uplink transmission in the pre-allocated uplink resources in subsequent time instances and/or may do so until an acknowledgement is received for the first uplink transmission, until a maximum number of retransmissions is achieved, or until the handover is considered completed or determined as failed, as described above.

In this regard, in method 500, optionally at Block 512, transmitting a subsequent retransmission of the first uplink transmission in the uplink resources of another time instance can be refrained from based at least in part on at least one of receiving an acknowledgement for the first uplink transmission or determining that a maximum number of retransmissions is achieved. In an aspect, communicating component 242, e.g., in conjunction with processor(s) 212, memory 216, transceiver 202, etc., can refrain from transmitting a subsequent retransmission of the first uplink transmission in the uplink resources of another time instance based at least in part on receiving an acknowledgement for the first uplink transmission or determining that a maximum number of retransmissions is achieved. In an example, resource determining component 252 can determine this time instance based on the indication (e.g., determined from the pre-allocated UL grant, similarly as determining the next uplink resource described in reference to Block 508). In addition, in an example, resource determining component 252 can determine this time instance based on determining that the time instance occurs before the handover is completed and/or before the handover is determined as failed (e.g., based on determining that the handover has not completed and/or the handover has not failed by the occurrence of this time instance). Thus, for example, when an acknowledgement is received or the maximum number of retransmissions is reached, any remaining pre-allocated uplink resources may be unused by the UE 104 (and/or may be released by the base station, as described further herein). In an example, the base station can configure the maximum number of retransmissions for the UE 104, which may be part of the indication received at Block 502 in one example. An example is shown in FIG. 9.

Figure 9:
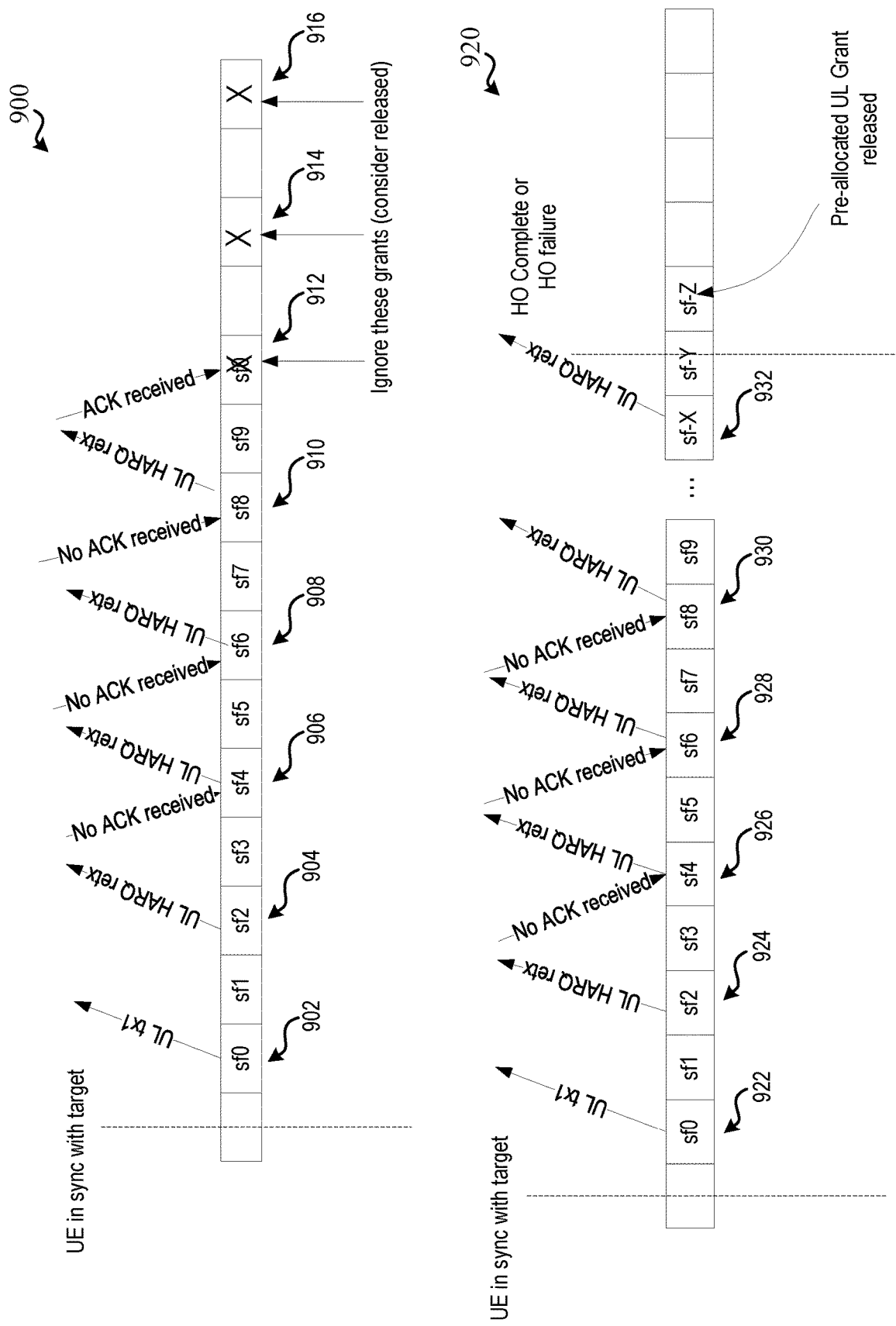
FIG. 9 illustrates an example of a resource allocation for retransmitting a first uplink transmission over pre-allocated uplink resources, in accordance with various aspects of the present disclosure.

FIG. 9 illustrates an example of a resource allocation 900 with subframes of pre-allocated uplink resources. In resource allocation 900, the UE can receive an indication of pre-allocated uplink resources with starting subframe 902 and with a periodicity of two subframes, such that pre-allocated uplink resources are in every other subframe (e.g., subframes 904, 906, 908, 910, 912, 914, 916), as shown. In this example, communicating component 242 can transmit the first uplink transmission in subframe 902 and can retransmit the first uplink transmission in each time instance according to the periodicity, including time instance of subframes 904, 906, 908, 910 as shown, until an acknowledgement is received in subframe 912. This may be the first acknowledgement or otherwise an acknowledgement for the first uplink transmission. At this point, communicating component 242 can refrain from retransmitting the first uplink transmission (or any other transmission) over the remaining pre-allocated resources (e.g., in subframes 912, 914, 916).

FIG. 9 also illustrates an example of a resource allocation 920 with subframes of pre-allocated uplink resources. In resource allocation 920, the UE can receive an indication of pre-allocated uplink resources with starting subframe 922 and with a periodicity of two subframes, such that pre-allocated uplink resources are in every other subframe (e.g., subframes 924, 926, 928, 930, 932), as shown. In this example, communicating component 242 can transmit the first uplink transmission in subframe 922 and can retransmit the first uplink transmission in each time instance according to the periodicity, including subframes 924, 926, 928, 930, 932, as shown, until the handover is considered completed or is determined as failed. At this point, communicating component 242 can refrain from retransmitting the first uplink transmission (or any other transmission over the remaining pre-allocated resources). In these examples, though retransmission of the first uplink transmission may cease, corresponding HARQ retransmissions for previous transmissions may continue.

Figure 6:
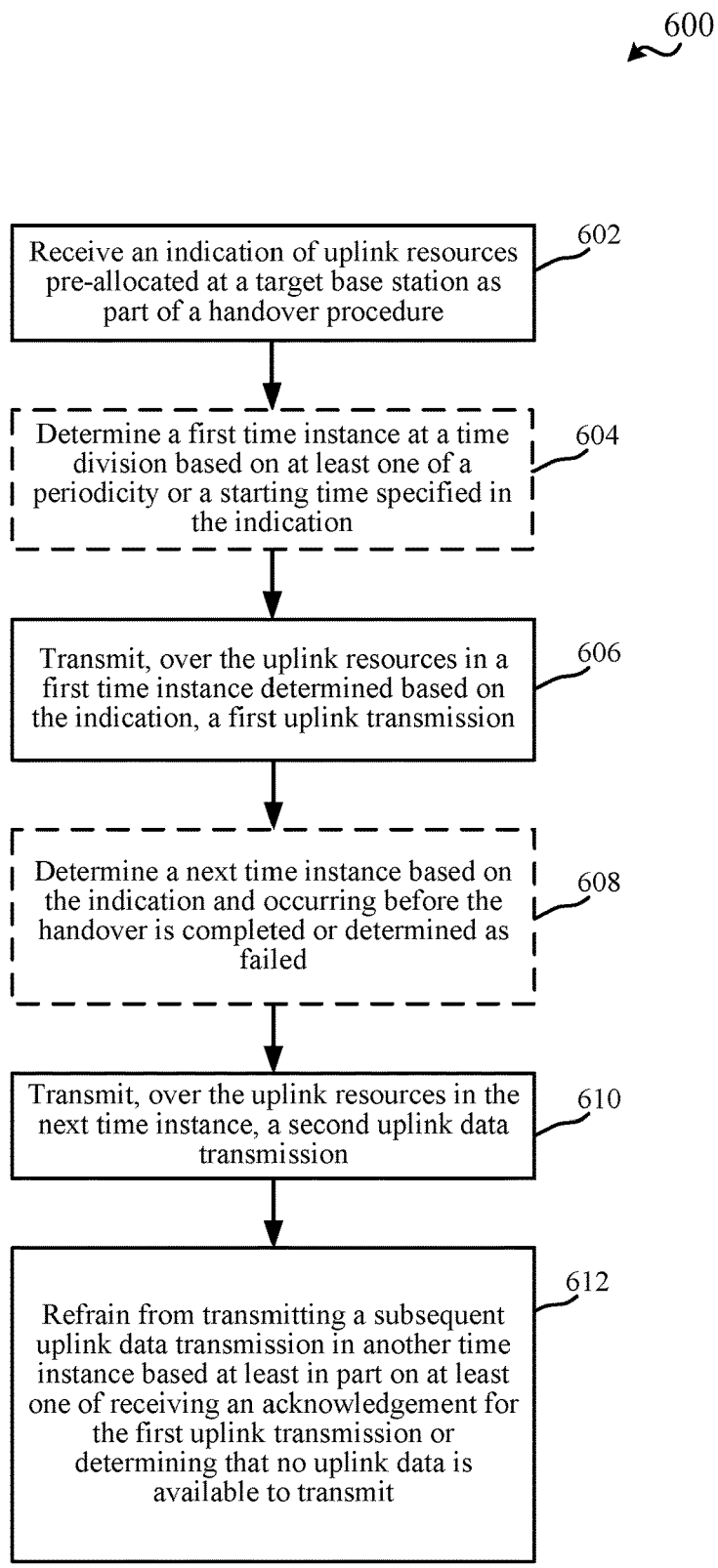
FIG. 6 is a flow chart illustrating an example of a method for transmitting uplink data transmissions over pre-allocated uplink resources, in accordance with various aspects of the present disclosure.

FIG. 6 illustrates a flow chart of an example of a method 600 for determining how to use pre-allocated uplink resources in a handover procedure. In an example, a UE 104 can perform the functions described in method 600 using one or more of the components described in FIGS. 1 and 2.

In method 600, at Block 602, an indication of uplink resources pre-allocated at a target base station can be received as part of a handover procedure. In an aspect, resource determining component 252, e.g., in conjunction with processor(s) 212, memory 216, transceiver 202, communicating component 242, etc., can receive the indication of the uplink resources pre-allocated at the target base station as part of the handover procedure, as described with respect to Block 402 in method 400 of FIG. 4.

In method 600, optionally at Block 604, a first time instance can be determined at a time division based on at least one of a periodicity or a starting time specified in the indication. In an aspect, resource determining component 252, e.g., in conjunction with processor(s) 212, memory 216, transceiver 202, communicating component 242, etc., can determine the first time instance at the time division based on at least one of the periodicity or the starting time specified in the indication, as described with respect to Block 404 in method 400 of FIG. 4.

In method 600, at Block 606, a first uplink transmission can be transmitted over the uplink resources in a first time instance determined based on the indication. In an aspect, communicating component 242, e.g., in conjunction with processor(s) 212, memory 216, transceiver 202, etc., can transmit, over the uplink resources in the first time instance determined based on the indication, the first uplink transmission, as described with respect to Block 408 in method 400 of FIG. 4.

In method 600, optionally at Block 608, a next time instance can be determined based on the indication and occurring before the handover is completed or determined as failed. In an aspect, resource determining component 252, e.g., in conjunction with processor(s) 212, memory 216, transceiver 202, communicating component 242, etc., can determine the next time instance based on the indication and occurring before the handover is completed or determined as failed, as described with respect to Block 508 in method 500 of FIG. 5.

In method 600, at Block 610, a second uplink data transmission can be transmitted over the uplink resources in the next time instance. In an aspect, communicating component 242, e.g., in conjunction with processor(s) 212, memory 216, transceiver 202, etc., can transmit, over the uplink resources in the next time instance, the second uplink data transmission. In an example, communicating component 242 can transmit the second uplink data transmission to include uplink data other than any data/message in the first uplink transmission. For example, the data in the second uplink data transmission can be from the buffer for which BSR is reported in the first uplink transmission at Block 606. In addition, for example, communicating component 242 can continue to transmit uplink data from the buffer as uplink data transmissions in the pre-allocated uplink resources in subsequent time instances (e.g., occurring at the indicated periodicity), e.g., except for time instances used to transmit retransmissions of the first uplink transmission, and/or may do so until an acknowledgement is received for the first uplink transmission, until there is no more uplink data to transmit, or until the handover is considered completed or determined as failed, as described above.

In this regard, in method 600, at Block 612, transmitting a subsequent uplink data transmission in another time instance can be refrained from based at least in part on at least one of receiving an acknowledgement for the first uplink transmission or determining that no uplink data is available to transmit. In an aspect, communicating component 242, e.g., in conjunction with processor(s) 212, memory 216, transceiver 202, etc., can refrain from transmitting a subsequent uplink data transmission in another time instance based at least in part on receiving an acknowledgement for the first uplink transmission or determining that no uplink data is available to transmit. In an example, resource determining component 252 can determine this time instance based on the indication (e.g., determined from the pre-allocated UL grant, similarly as determining the next uplink resource described in reference to Block 508). In addition, in an example, resource determining component 252 can determine this time instance based on determining that the time instance occurs before the handover is completed and/or before the handover is determined as failed (e.g., based on determining that the handover has not completed and/or the handover has not failed by the occurrence of this time instance). In addition, in an example, communicating component 242 can also refrain from transmitting retransmissions of the first uplink transmission where the acknowledgement is received. Thus, for example, when an acknowledgement is received or there is no uplink data left in the buffer, any remaining pre-allocated uplink resources may be unused by the UE 104 (and/or may be released by the base station, as described further herein). An example is shown in FIG. 10.

Figure 10:
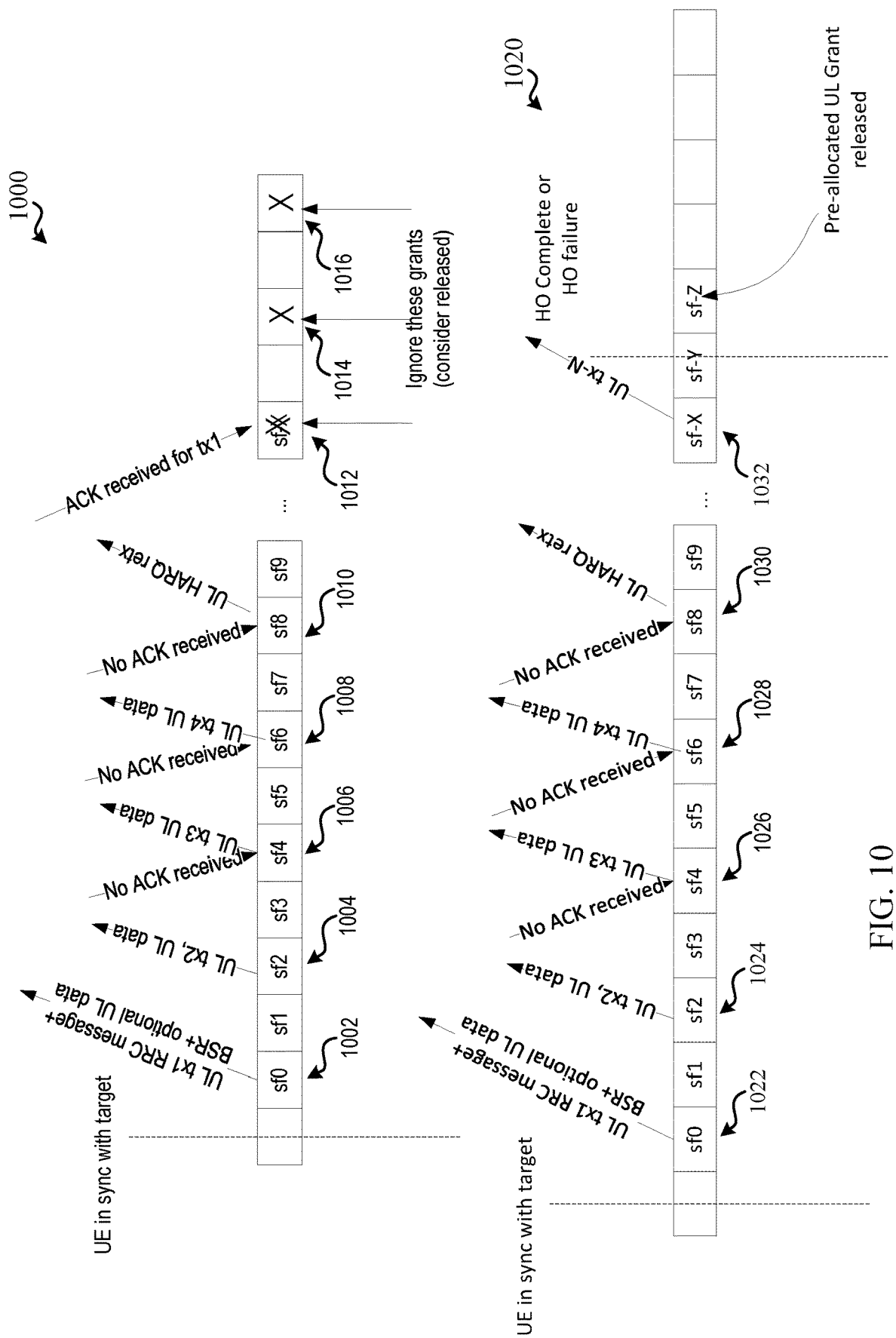
FIG. 10 illustrates an example of a resource allocation for transmitting uplink data transmissions over pre-allocated uplink resources, in accordance with various aspects of the present disclosure.

FIG. 10 illustrates an example of a resource allocation 1000 with subframes of pre-allocated uplink resources. In resource allocation 1000, the UE can receive an indication of pre-allocated uplink resources with starting subframe 1002 and with a periodicity of two subframes, such that pre-allocated uplink resources are in every other subframe (e.g., subframes 1004, 1006, 1008, 1010, 1012, 1014, 1016), as shown. In this example, communicating component 242 can transmit the first uplink transmission in subframe 1002 and can transmit other uplink data transmissions in each time instance according to the periodicity, including subframes 1004, 1006, 1008 as shown, (and/or retransmissions of the first uplink transmission, as shown in time period 1010) until an acknowledgement is received in subframe 1012. This may be the first acknowledgement or otherwise an acknowledgement for the first uplink transmission. At this point, communicating component 242 can refrain from transmitting any more data transmissions and/or retransmitting the first uplink transmission (or any other transmission) over the remaining pre-allocated resources.

FIG. 10 also illustrates an example of a resource allocation 1020 with subframes of pre-allocated uplink resources. In resource allocation 1020, the UE can receive an indication of pre-allocated uplink resources with starting subframe 1022 and with a periodicity of two subframes, such that pre-allocated uplink resources are in every other subframe (e.g., subframes 1024, 1026, 1028, 1030, 1032), as shown. In this example, communicating component 242 can transmit the first uplink transmission in subframe 1022 and can transmit other uplink data transmissions in each time instance according to the periodicity, including subframes 1024, 1026, 1028, 1032, as shown, (and/or retransmissions of the first uplink transmission, as shown in subframe 1030) until the handover is considered completed or is determined as failed. At this point, communicating component 242 can refrain from transmitting other data transmissions and/or retransmitting the first uplink transmission (or any other transmission) over the remaining pre-allocated resources. In these examples, though retransmission of the first uplink transmission may cease, corresponding HARQ retransmissions for previous transmissions may continue.

In an example, the UE 104 can be configured, by the base station or other network component (e.g., via signaling in the indication of pre-allocated uplink resources or other control signaling), to use one or more of the examples described above. For example, communicating component 242 may receive, from the base station, an indication of an example to use (e.g., method 400 of FIG. 4, method 500 of FIG. 5, or method 600 of FIG. 6, or similar functions) in determining how to use pre-allocated uplink resources. In one example, a bit may indicate to use one option or another. In another example, a larger value may be used to indicate one of three or more options, etc. Resource determining component 252 can determine which mechanism to employ based on the configured indication in this example.

Figure 7:
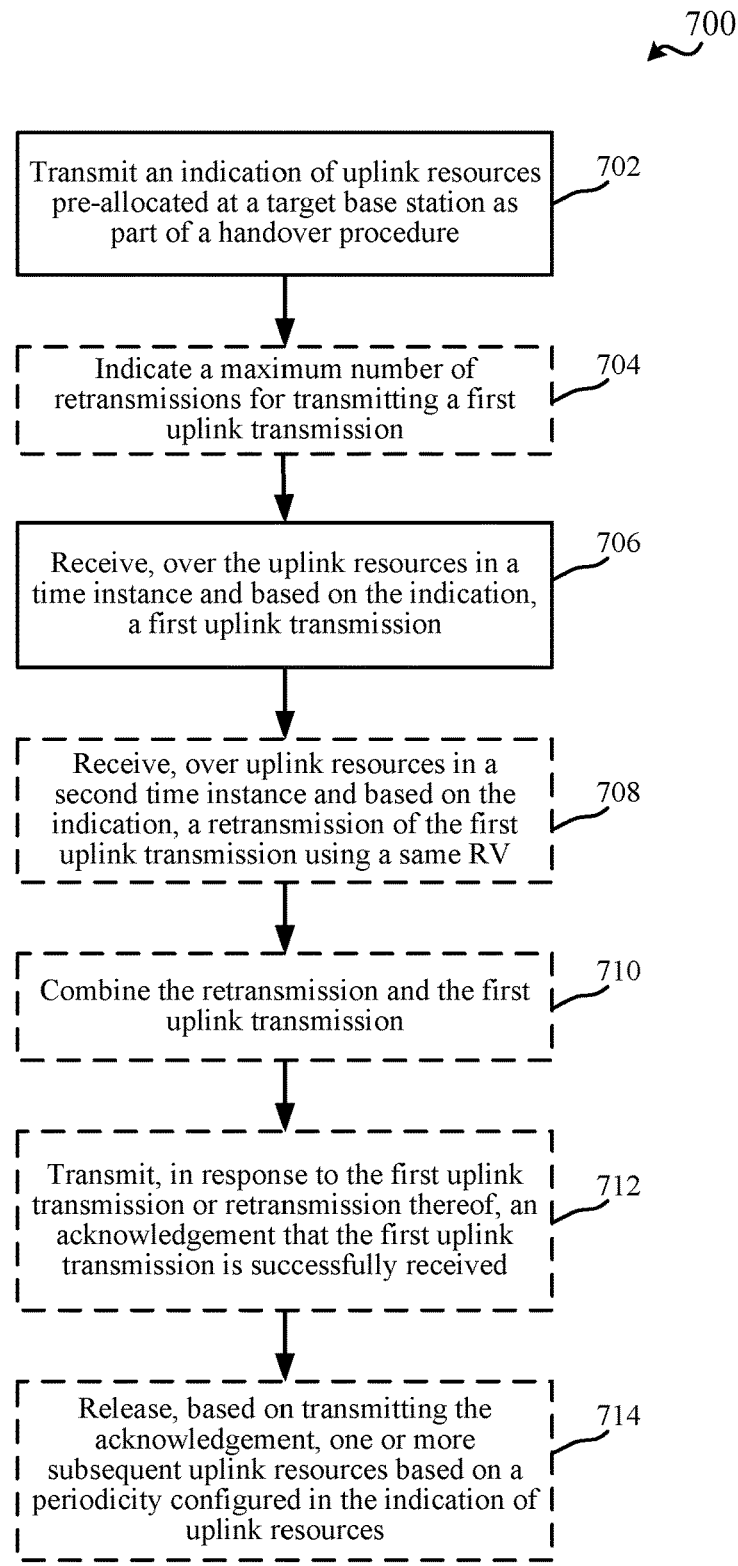
FIG. 7 is a flow chart illustrating an example of a method for pre-allocating uplink resources as part of a handover procedure, in accordance with various aspects of the present disclosure.

FIG. 7 illustrates a flow chart of an example of a method 700 for pre-allocating uplink resources in a handover procedure. In an example, a base station 102 can perform the functions described in method 700 using one or more of the components described in FIGS. 1 and 3.

In method 700, at Block 702, an indication of uplink resources pre-allocated at a target base station can be transmitted as part of a handover procedure. In an aspect, scheduling component 342, e.g., in conjunction with processor(s) 312, memory 316, transceiver 302, etc., can transmit an indication of uplink resources pre-allocated at the target base station as part of the handover procedure. In an example, a handover procedure can be initiated for the UE 104 to handover communications from a serving base station to a target base station, as described. As part of the handover, uplink resources may be pre-allocated at the target base station to allow the UE 104 to transmit uplink communications over the pre-allocated resources without requiring a random access, or RACH, procedure to receive an uplink resource grant. In this example, scheduling component 342 (e.g., of the serving base station) can transmit the indication of the pre-allocated resources as part of a message in the handover procedure (e.g., in a handover command indicating to handover from the serving base station to the target base station). In addition, for example, the indication may indicate one or more parameters from which the pre-allocated uplink resources can be determined, such as a periodicity, start time, granted frequency resources, etc., as described. Moreover, in one example as described, scheduling component 342 may also indicate to the UE 104 which of multiple mechanisms to use in determining how to use the pre-allocated uplink resources (e.g., the example of method 400 of FIG. 4, method 500 of FIG. 5, method 600 of FIG. 6, etc.).

In method 700, optionally at Block 704, a maximum number of retransmissions for transmitting a first uplink transmission can be indicated. In an aspect, scheduling component 342, e.g., in conjunction with processor(s) 312, memory 316, transceiver 302, etc., can indicate (e.g., in the indication of the pre-allocated resources, in a separate configuration or other transmission, etc.) the maximum number of retransmissions for transmitting the first uplink transmission. For example, scheduling component 342 can indicate the maximum number of retransmissions in RRC signaling, system information broadcast, etc., and may apply more generally to other uplink transmissions as well. As described, the first uplink transmission may include a confirmation message for the handover, a BSR, and/or uplink data.

In method 700, at Block 706, a first uplink transmission can be received over the uplink resources in a time instance and based on the indication. In an aspect, scheduling component 342, e.g., in conjunction with processor(s) 312, memory 316, transceiver 302, etc., can receive, over the time instance and based on the indication, the first uplink transmission. For example, scheduling component 342 can receive the first uplink transmission over a time instance corresponding to the pre-allocated uplink resources, where the time instance may correspond to a starting time (e.g., as specified in the indication) or a time instance subsequent to the starting time based on the periodicity (e.g., as specified in the indication). In addition, in one example, scheduling component 342 can determine that the handover is confirmed by the UE 104 based on the first uplink transmission.

In method 700, optionally at Block 708, a retransmission of the first uplink transmission can be received over uplink resources in a second time instance and based on the indication. In an aspect, scheduling component 342, e.g., in conjunction with processor(s) 312, memory 316, transceiver 302, etc., can receive, over the uplink resources in the second time instance and based on the indication, the retransmission of the first uplink transmission. For example, scheduling component 342 can receive the retransmission of the first uplink transmission over the second time instance corresponding to the pre-allocated uplink resources, which may be a time instance subsequent to the starting time and may be based on the periodicity. In an example, the uplink resources may include the same frequency resources as those over which the first uplink transmission is received, but may be in a subsequent time instance (e.g., a subsequent subframe, slot, symbol, etc., based on the periodicity). Additionally, the retransmission can be received based on a same RV as used for the first uplink transmission (and/or one or more other retransmissions).

In this example, in method 700, optionally at Block 710, the retransmission and the first uplink transmission can be combined. In an aspect, scheduling component 342, e.g., in conjunction with processor(s) 312, memory 316, transceiver 302, etc., can combine the retransmission(s) and the first uplink transmission to obtain relevant data. In one example, scheduling component 342 can receive and combine multiple transmissions (e.g., the first uplink transmission and one or more retransmissions). In addition, as described above and further herein, scheduling component 342 may receive the retransmission based on transmitting negative-acknowledgement feedback for the first uplink transmission and/or one or more retransmissions.

In any case, in method 700, optionally at Block 712, an acknowledgement that the first uplink transmission is successfully received can be transmitted in response to the first uplink transmission or a retransmission thereof. In an aspect, feedback component 352, e.g., in conjunction with processor(s) 312, memory 316, transceiver 302, scheduling component 342, etc., can transmit, in response to the first uplink transmission or a retransmission thereof, the acknowledgement that the first uplink transmission is successfully received. In an example, feedback component 352 can transmit the acknowledgement in a time instance of the pre-allocated uplink resources (e.g., over a physical downlink control channel (PDCCH)).

In method 700, optionally at Block 714, subsequent uplink resources based on a periodicity configured in the indication of uplink resources can be released based on transmitting the acknowledgement. In an aspect, resource releasing component 354, e.g., in conjunction with processor(s) 312, memory 316, transceiver 302, scheduling component 342, etc., can release, based on transmitting the acknowledgement, subsequent uplink resources (e.g., indicated as pre-allocated in one or more subsequent time instances) based on the periodicity configured in the indication of the uplink resources. For example, transmitting the acknowledgment can cause the UE 104 to refrain from transmitting over the pre-allocated resources, as described above, and thus resource releasing component 354 can release the remaining resources (e.g., for reallocation to other devices). In one example, resource releasing component 354 can additionally release the resource based on receiving an indication from the UE 104 that the acknowledgement is received.

Figure 11:
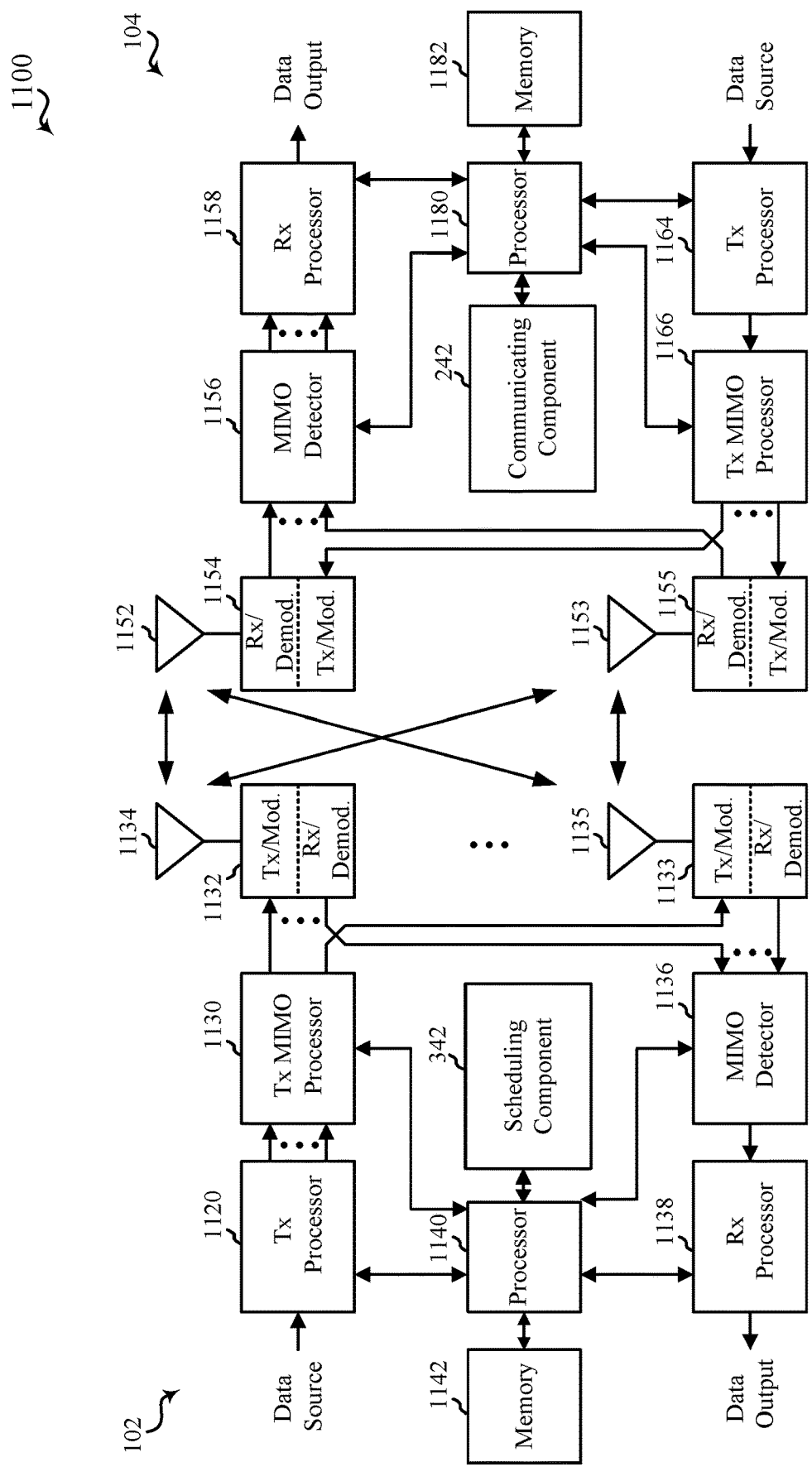
FIG. 11 is a block diagram illustrating an example of a MIMO communication system including a base station and a UE, in accordance with various aspects of the present disclosure.

FIG. 11 is a block diagram of a MIMO communication system 1100 including a base station 102 and a UE 104. The MIMO communication system 1100 may illustrate aspects of the wireless communication access network 100 described with reference to FIG. 1. The base station 102 may be an example of aspects of the base station 102 described with reference to FIG. 1. The base station 102 may be equipped with antennas 1134 and 1135, and the UE 104 may be equipped with antennas 1152 and 1153. In the MIMO communication system 1100, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1120 may receive data from a data source. The transmit processor 1120 may process the data. The transmit processor 1120 may also generate control symbols or reference symbols. A transmit MIMO processor 1130 may perform spatial processing (e.g., precoding) on data symbols, control symbols, or reference symbols, if applicable, and may provide output symbol streams to the transmit modulator/demodulators 1132 and 1133. Each modulator/demodulator 1132 through 1133 may process a respective output symbol stream (e.g., for OFDM, etc.) to obtain an output sample stream. Each modulator/demodulator 1132 through 1133 may further process (e.g., convert to analog, amplify, filter, and upconvert) the output sample stream to obtain a DL signal. In one example, DL signals from modulator/demodulators 1132 and 1133 may be transmitted via the antennas 1134 and 1135, respectively.

The UE 104 may be an example of aspects of the UEs 104 described with reference to FIGS. 1-2. At the UE 104, the UE antennas 1152 and 1153 may receive the DL signals from the base station 102 and may provide the received signals to the modulator/demodulators 1154 and 1155, respectively. Each modulator/demodulator 1154 through 1155 may condition (e.g., filter, amplify, downconvert, and digitize) a respective received signal to obtain input samples. Each modulator/demodulator 1154 through 1155 may further process the input samples (e.g., for OFDM, etc.) to obtain received symbols. A MIMO detector 1156 may obtain received symbols from the modulator/demodulators 1154 and 1155, perform MIMO detection on the received symbols, if applicable, and provide detected symbols. A receive (Rx) processor 1158 may process (e.g., demodulate, deinterleave, and decode) the detected symbols, providing decoded data for the UE 104 to a data output, and provide decoded control information to a processor 1180, or memory 1182.

The processor 1180 may in some cases execute stored instructions to instantiate a communicating component 242 (see e.g., FIGS. 1 and 2).

On the uplink (UL), at the UE 104, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the modulator/demodulators 1154 and 1155 (e.g., for SC-FDMA, etc.), and be transmitted to the base station 102 in accordance with the communication parameters received from the base station 102. At the base station 102, the UL signals from the UE 104 may be received by the antennas 1134 and 1135, processed by the modulator/demodulators 1132 and 1133, detected by a MIMO detector 1136 if applicable, and further processed by a receive processor 1138. The receive processor 1138 may provide decoded data to a data output and to the processor 1140 or memory 1142.

The processor 1140 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1100. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1100.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication by a user equipment (UE) the method comprising:
   receiving an indication of uplink resources pre-allocated at a target base station as part of a handover procedure from a serving base station to the target base station;
   determining a first time instance of the uplink resources based on the indication;
   transmitting a first uplink transmission in the first time instance of the uplink resources;
   determining one or more subsequent time instances of the uplink resources based on the indication and as occurring before the handover procedure is completed or occurring before it has been determined that the handover procedure has failed; and based on said determining of the one or more subsequent time instances of the uplink resources, performing one of:
refraining from transmitting in the one or more subsequent time instances of the uplink resources, or transmitting a retransmission of the first uplink transmission in the one or more subsequent time instances of the uplink resources.

2. The method of example 1, wherein transmitting the first uplink transmission comprises transmitting the first uplink transmission to the target base station.

3. The method of any of examples 1 or 2, wherein the first uplink transmission comprises a message to confirm the handover procedure.

4. The method of example 3, wherein the first uplink transmission further comprises at least one of a buffer status report or uplink data.

5. The method of any of examples 1 to 4, further comprising determining the first time instance at a time division based on at least one of a periodicity or a starting time specified in the indication.

6. The method of any of examples 1 to 5, wherein transmitting the retransmission is based on detecting that a negative-acknowledgement is received for the first uplink transmission.

7. The method of any of examples 1 to 6, wherein transmitting the retransmission is based on detecting that an acknowledgement is not received for the first uplink transmission within a threshold period of time.

8. The method of any of examples 1 to 7, further comprising determining the first time instance and the one or more subsequent time instances at respective time divisions based on at least one of a periodicity or a starting time specified in the indication.

9. A method for wireless communication, comprising:
receiving, by a user equipment, an indication of uplink resources pre-allocated at a target base station as part of a handover procedure from a serving base station to the target base station;
transmitting, by the user equipment over the uplink resources in a first time instance determined based on the indication, a first uplink transmission comprising at least one of a message to confirm the handover procedure, a buffer status report, or uplink data; and
transmitting, by the user equipment over a second uplink resource, determined based on the indication and as occurring before the handover procedure is completed or before it has been determined that the handover procedure has failed, a retransmission of the first uplink transmission, wherein the second uplink resource is adjacent in time to the first time instance based on the indication.

10. The method of example 9, wherein the indication of the uplink resources includes a periodicity for the uplink resources, and wherein the first time instance and the second time instance are adjacent in time based on the periodicity.

11. The method of any of examples 9 or 10, wherein transmitting the retransmission comprises using a same redundancy version as used when transmitting the first uplink transmission.

12. The method of any of examples 9 to 11, further comprising transmitting, by the user equipment over the uplink resources in a third uplink resource, determined based on the indication and occurring before the handover is completed or determined as failed, a second retransmission of the first uplink transmission, wherein the third uplink resource is adjacent in time to the second uplink resource based on the indication.

13. The method of any of examples 9 to 12, further comprising refraining, by the user equipment, from transmitting a subsequent retransmission of the first uplink transmission in a third uplink resource, determined based on the indication and occurring before the handover is completed or determined as failed, based at least in part on receiving an acknowledgement for the first uplink transmission.

14. The method of any of examples 9 to 13, further comprising refraining, by the user equipment, from transmitting a subsequent retransmission of the first uplink transmission in a third uplink resource, determined based on the indication and occurring before the handover is completed or determined as failed, based at least in part on determining that a maximum number of retransmissions is achieved.

15. The method of any of examples 9 to 14, further comprising refraining, by the user equipment, from transmitting a subsequent retransmission of the first uplink transmission in a third uplink resource occurring after the handover is completed or determined as failed.

16. A method for wireless communication, comprising
receiving, by a user equipment, an indication of uplink resources pre-allocated at a target base station as part of a handover procedure from a serving base station to the target base station;
transmitting, by the user equipment over the uplink resources in a first time instance determined based on the indication, a first uplink transmission comprising at least one of a message to confirm the handover procedure, a buffer status report, or uplink data;
transmitting, by the user equipment over a second uplink resource, determined based on the indication and occurring before the handover is completed or determined as failed, a first uplink data transmission, wherein the second uplink resource is adjacent in time to the first time instance based on the indication; and
refraining, by the user equipment, from transmitting a subsequent uplink data transmission in a third uplink resource, determined based on the indication and as occurring before the handover procedure is completed or before it is determined that the handover procedure has failed, based at least in part on at least one of receiving an acknowledgement for the first uplink transmission or determining that no uplink data is available to transmit.

17. The method of example 16, wherein the indication of the uplink resources includes a periodicity for the uplink resources, and wherein the first time instance and the second uplink resource are adjacent in time based on the periodicity.

18. The method of any of examples 16 or 17, further comprising refraining from transmitting a third uplink data transmission of in a fourth uplink resource occurring after the handover is completed or determined as failed.

19. A method for wireless communication, comprising
transmitting, for a target base station to a user equipment, an indication of uplink resources pre-allocated at the target base station as part of a handover procedure from a serving base station to the target base station;
receiving, from the user equipment over the uplink resources in a first time instance and based on the indication, a first uplink transmission comprising at least one of a message to confirm the handover procedure, a buffer status report, or uplink data;
transmitting, in response to the first uplink transmission, an acknowledgement that the first uplink transmission is successfully received; and
releasing, by the target base station and based on transmitting the acknowledgement, the one or more subsequent uplink resources based on a periodicity configured in the indication of uplink resources.

20. The method of example 19, wherein the first uplink transmission is a retransmission of a previously transmitted uplink transmission comprising at least one of the message to confirm the handover procedure, the buffer status report, or the uplink data.

21. The method of any of examples 19 or 20, further comprising:
receiving, from the user equipment over second uplink resources and based on the indication, a retransmission of the first uplink transmission using a same redundancy version (RV); and
combining the first uplink transmission and retransmission, based on the same RV, to decode corresponding data.

22. The method of any of examples 19 to 21, further comprising transmitting, to the user equipment, a maximum number of retransmissions configured for transmitting the first uplink transmission using the uplink resources pre-allocated at the target base station.

23. An apparatus for wireless communication, comprising:
a transceiver;
a memory configured to store instructions; and
one or more processors communicatively coupled with the transceiver and the memory, wherein the one or more processors are configured to execute the instructions to perform the operations of one or more methods in any of examples 1 to 22.

24. An apparatus for wireless communication, comprising means for performing the operations of one or more methods in any of examples 1 to 22.

25. A computer-readable medium, comprising code executable by one or more processors to perform the operations of one or more methods in any of examples 1 to 22.

What is claimed is:

1. A method for wireless communication by a user equipment (UE) the method comprising:
receiving, from a serving base station, an indication of uplink resources pre-allocated at a target base station as part of a handover procedure from the serving base station to the target base station, wherein the indication includes a periodicity and a starting time for the uplink resources;
transmitting, based on the indication of the uplink resources, in a first time instance corresponding to at least one of the starting time or the periodicity for the uplink resources, and before the handover procedure is completed, a first uplink transmission; and
based on transmitting the first uplink transmission, refraining from transmitting in one or more subsequent time instances of the uplink resources that are defined by the starting time and the periodicity before the handover procedure is completed.

2. The method of claim 1, wherein transmitting the first uplink transmission comprises transmitting the first uplink transmission to the target base station, and wherein refraining from transmitting comprises refraining from transmitting uplink transmissions to the target base station in the one or more subsequent time instances.

3. The method of claim 1, wherein the first uplink transmission comprises a message to confirm the handover procedure.

4. The method of claim 3, wherein the first uplink transmission further comprises at least one of a buffer status report or uplink data.

5. The method of claim 1, further comprising determining the first time instance at a time division based on at least one of the periodicity or the starting time.

6. The method of claim 1, further comprising, based on transmitting the first uplink transmission and based on detecting that a negative-acknowledgement is received for the first uplink transmission, retransmitting the first uplink transmission in one or more additional subsequent time instances that are subsequent to the one or more subsequent time instances and correspond to at least one of the starting time or the periodicity and are before the handover procedure is completed.

7. The method of claim 1, further comprising, based on transmitting the first uplink transmission and based on detecting that an acknowledgement is not received for the first uplink transmission within a threshold period of time, retransmitting the first uplink transmission in one or more additional subsequent time instances that are subsequent to the one or more subsequent time instances and correspond to at least one of the starting time or the periodicity and are before the handover procedure is completed.

8. The method of claim 1, further comprising determining the first time instance and the one or more subsequent time instances at respective time divisions based on at least one of the periodicity or the starting time.

9. An apparatus for wireless communication, comprising:
a transceiver;
a memory configured to store instructions related to transmitting over uplink resources; and
one or more processors communicatively coupled with the transceiver and the memory, wherein the one or more processors are configured to:
receive, from a serving base station, an indication of uplink resources pre-allocated at a target base station as part of a handover procedure from the serving base station to the target base station, wherein the indication includes a periodicity and a starting time for the uplink resources;
transmit, based on the indication of the uplink resources, in a first time instance corresponding to at least one of the starting time or the periodicity for the uplink resources, and before the handover procedure is completed, a first uplink transmission; and
based on transmitting the first uplink transmission, refrain from transmitting in one or more subsequent time instances of the uplink resources that are defined by the starting time and the periodicity before the handover procedure is completed.

10. The apparatus of claim 9, wherein the one or more processors are configured to transmit the first uplink transmission to the target base station, and wherein the one or more processors are configured to refrain from transmitting uplink transmissions to the target base station in the one or more subsequent time instances.

11. The apparatus of claim 9, wherein the first uplink transmission comprises a message to confirm the handover procedure.

12. The apparatus of claim 11, wherein the first uplink transmission further comprises at least one of a buffer status report or uplink data.

13. The apparatus of claim 9, wherein the one or more processors are further configured to determine the first time instance at a time division based on at least one of the periodicity or the starting time.

14. The apparatus of claim 9, wherein the one or more processors are further configured to, based on transmitting the first uplink transmission and based on detecting that a negative-acknowledgement is received for the first uplink transmission, retransmit the first uplink transmission in one or more additional subsequent time instances that are subsequent to the one or more subsequent time instances and correspond to at least one of the starting time or the periodicity and are before the handover procedure is completed.

15. The apparatus of claim 9, wherein the one or more processors are further configured to, based on transmitting the first uplink transmission and based on detecting that an acknowledgement is not received for the first uplink transmission within a threshold period of time, retransmit the first uplink transmission in one or more additional subsequent time instances that are subsequent to the one or more subsequent time instances and correspond to at least one of the starting time or the periodicity and are before the handover procedure is completed.

16. The apparatus of claim 9, wherein the one or more processors are further configured to determine the first time instance and the one or more subsequent time instances at respective time divisions based on at least one of the periodicity or the starting time.

17. An apparatus for wireless communication, comprising:
means for receiving, from a serving base station, an indication of uplink resources pre-allocated at a target base station as part of a handover procedure from the serving base station to the target base station, wherein the indication includes a periodicity and a starting time for the uplink resources;
means for transmitting, based on the indication of the uplink resources, in a first time instance corresponding to at least one of the starting time or the periodicity for the uplink resources, and before the handover procedure is completed, a first uplink transmission; and
based on transmitting the first uplink transmission, means for refraining from transmitting in one or more subsequent time instances of the uplink resources that are defined by the starting time and the periodicity before the handover procedure is completed.

18. The apparatus of claim 17, wherein the means for transmitting the first uplink transmission transmits the first uplink transmission to the target base station, and wherein the means for refraining from transmitting refrains from transmitting uplink transmissions to the target base station in the one or more subsequent time instances.

19. The apparatus of claim 17, wherein the first uplink transmission comprises a message to confirm the handover procedure.

20. The apparatus of claim 19, wherein the first uplink transmission further comprises at least one of a buffer status report or uplink data.

21. The apparatus of claim 17, further comprising means for determining the first time instance at a time division based on at least one of the periodicity or the starting time.

22. The apparatus of claim 17, further comprising means for, based on transmitting the first uplink transmission and based on detecting that a negative-acknowledgement is received for the first uplink transmission, retransmitting the first uplink transmission in one or more additional subsequent time instances that are subsequent to the one or more subsequent time instances and correspond to at least one of the starting time or the periodicity and are before the handover procedure is completed.

23. The apparatus of claim 17, further comprising means for, based on transmitting the first uplink transmission and based on detecting that an acknowledgement is not received for the first uplink transmission within a threshold period of time, retransmitting the first uplink transmission in one or more additional subsequent time instances that are subsequent to the one or more subsequent time instances and correspond to at least one of the starting time or the periodicity and are before the handover procedure is completed.

24. The apparatus of claim 17, further comprising means for determining the first time instance and the one or more subsequent time instances at respective time divisions based on at least one of the periodicity or the starting time.

25. A non-transitory computer-readable medium, comprising code executable by one or more processors for wireless communications, the code comprising code for:
receiving, from a serving base station, an indication of uplink resources pre-allocated at a target base station as part of a handover procedure from the serving base station to the target base station, wherein the indication includes a periodicity and a starting time for the uplink resources;
transmitting, based on the indication of the uplink resources, in a first time instance corresponding to at least one of the starting time or the periodicity for the uplink resources, and before the handover procedure is completed, a first uplink transmission in the first time instance of the uplink resources; and
based on transmitting the first uplink transmission, refraining from transmitting in one or more subsequent time instances of the uplink resources that are defined by the starting time and the periodicity before the handover procedure is completed.

26. The non-transitory computer-readable medium of claim 25, wherein the code for transmitting the first uplink transmission transmits the first uplink transmission to the target base station, and wherein the code for refraining from transmitting refrains from transmitting uplink transmissions to the target base station in the one or more subsequent time instances.

27. The non-transitory computer-readable medium of claim 25, wherein the first uplink transmission comprises a message to confirm the handover procedure.

28. The non-transitory computer-readable medium of claim 27, wherein the first uplink transmission further comprises at least one of a buffer status report or uplink data.

29. The non-transitory computer-readable medium of claim 25, further comprising code for determining the first time instance at a time division based on at least one of the periodicity or the starting time.

30. The non-transitory computer-readable medium of claim 25, further comprising code for, based on transmitting the first uplink transmission and based on detecting that a negative-acknowledgement is received for the first uplink transmission, retransmitting the first uplink transmission in one or more additional subsequent time instances that are subsequent to the one or more subsequent time instances and correspond to at least one of the starting time or the periodicity and are before the handover procedure is completed.

31. The non-transitory computer-readable medium of claim 25, further comprising code for, based on transmitting the first uplink transmission and based on detecting that an acknowledgement is not received for the first uplink transmission within a threshold period of time, retransmitting the first uplink transmission in one or more additional subsequent time instances that are subsequent to the one or more subsequent time instances and correspond to at least one of the starting time or the periodicity and are before the handover procedure is completed.

32. The non-transitory computer-readable medium of claim 25, further comprising code for determining the first time instance and the one or more subsequent time instances at respective time divisions based on at least one of the periodicity or the starting time.

\* \* \* \* \*